US008873418B2

(12) United States Patent
Robinson et al.

(10) Patent No.: US 8,873,418 B2
(45) Date of Patent: Oct. 28, 2014

(54) METHODS AND APPARATUS FOR NETWORK CAPACITY ENHANCEMENT FOR WIRELESS DEVICE COEXISTENCE

(75) Inventors: Michael A. Robinson, Menlo Park, CA (US); Camille Chen, Cupertino, CA (US); Jaime Tolentino, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/609,081

(22) Filed: Sep. 10, 2012

(65) Prior Publication Data

US 2013/0064118 A1    Mar. 14, 2013

Related U.S. Application Data

(63) Continuation of application No. 12/082,586, filed on Apr. 11, 2008, now Pat. No. 8,265,017.

(51) Int. Cl.
*H04W 84/12* (2009.01)

(52) U.S. Cl.
USPC .......................................................... 370/252

(58) Field of Classification Search
CPC ...................................................... H04B 15/00
See application file for complete search history.

(56) References Cited

U.S. PATENT DOCUMENTS

| | | |
|---|---|---|
| 6,978,121 B1 | 12/2005 | Lane et al. |
| 7,546,142 B2 | 6/2009 | Ginzburg et al. |
| 7,701,913 B2 | 4/2010 | Chen et al. |
| 2005/0192048 A1* | 9/2005 | Bridgelall .................. 455/553.1 |
| 2005/0215197 A1 | 9/2005 | Chen et al. |
| 2005/0239497 A1 | 10/2005 | Bahl et al. |
| 2006/0005058 A1 | 1/2006 | Chen et al. |
| 2006/0030265 A1 | 2/2006 | Desai et al. |
| 2006/0030266 A1 | 2/2006 | Desai et al. |
| 2006/0084383 A1 | 4/2006 | Ibrahim et al. |
| 2006/0133259 A1 | 6/2006 | Lin et al. |
| 2006/0274704 A1 | 12/2006 | Desai et al. |
| 2007/0060055 A1 | 3/2007 | Desai et al. |
| 2007/0080781 A1 | 4/2007 | Ginzburg et al. |
| 2007/0099567 A1 | 5/2007 | Chen et al. |
| 2007/0161352 A1* | 7/2007 | Dobrowski et al. ............. 455/69 |
| 2007/0224936 A1 | 9/2007 | Desai |

OTHER PUBLICATIONS

Buettner, (X-MAC: A Short Preamble Mac Protocol for Duty-Cycled Wireless Sensor Networks), 2006, p. 14.*

* cited by examiner

*Primary Examiner* — Sulaiman Nooristany
(74) *Attorney, Agent, or Firm* — Gazdzinski & Associates, PC

(57) ABSTRACT

Methods and apparatus for enhancing network capacity in a network comprising multiple wireless communication that overlap at least partly in frequency spectrum. In one embodiment, the apparatus comprises a portable device such as a laptop or smartphone having both a WLAN (e.g., Wi-Fi) interface and a PAN (e.g., Bluetooth) interface which each operate with approximately the same frequency range. One variant places the WLAN interface into a power-saving mode as a default, thereby mitigating interference with the PAN interface in cases where the WLAN interface is not in active use. In another variant, an aggressive PAN management algorithm is used to enforce network policy on the PAN interface, thereby mitigating interference between the PAN interface and the WLAN interfaces of other devices in the network (as well as the parent device). AP-based variants are also described. Methods of operation and doing business utilizing the aforementioned apparatus are also disclosed.

20 Claims, 14 Drawing Sheets

METHODS AND APPARATUS FOR NETWORK CAPACITY ENHANCEMENT FOR WIRELESS DEVICE COEXISTENCE

Priority and Related Applications

This application is a continuation of and claims priority to co-owned co-pending U.S. Patent application Ser. No. 12/082,586 filed Apr. 11, 2008, and entitled "METHODS AND APPARATUS FOR NETWORK CAPACITY ENHANCEMENT FOR WIRELESS DEVICE COEXISTENCE", (issuing as U.S. Patent No. 8,265,017), which is incorporated herein by reference in its entirety.

This application is also related to co-owned and co-pending U.S. Patent application Ser. No. 12/006,992 filed Jan. 7, 2008 and entitled "Method and Apparatus for Wireless Device Coexistence", the contents of which are incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of wireless communication and data networks. More particularly, in one exemplary aspect, the present invention is directed to compensating for or mitigating the effects of electro-magnetic signal interference in devices implementing two or more wireless air interfaces or protocols.

2. Description of Related Technology

The effective implementation of convergence products has led to a revolution in the way consumers view computerized devices. These next generation computerized devices focus on offering consumers a substantially unified solution for a variety of services to which consumers have become accustomed. One example of such a converged solution is the exemplary M82 ("MacBook Air") laptop computer or iPhone™ each manufactured by the Assignee hereof, which support a variety of wireless protocols and other functions. For instance, the iPhone™ has the capability of, among other things, sending and receiving emails over a wireless LAN (WLAN) network, making and receiving calls using a GSM cellular network, and operating wireless peripheral equipment (such as wireless head sets) using the Bluetooth (BT) protocol.

Converged Device Performance Issues

As technologies converge, implementation requirements and constraints, including cost, size, and antenna isolation in these hardware systems inevitably will introduce difficulties that can potentially result in a poor user experience with the device. For example, both BT and WLAN (802.11b/g/n) share the same ISM band in the 2.4-2.8 GHz frequency range. Due to the close physical proximity of these wireless interfaces (including their antenna) in these converged or unified devices, the BT and WLAN technologies can interfere with each other when operating simultaneously, and can cause problems such as for example BT audio stutter and drop-outs, slow WLAN transfer speeds, poor BT mouse tracking, etc.

Several solutions have been contemplated in the prior art to address the co-existence problems of co-located or proximate wireless technologies. For example, United States Patent Publication No. 20070099567 to Chen; et al. published May 3, 2007 and entitled "Methods and apparatus for providing a platform coexistence system of multiple wireless communication devices" discloses various embodiments of methods and apparatus for providing a platform coexistence system of multiple wireless communication devices.

United States Patent Publication No. 20070080781 to Ginzburg; et al. published Apr. 12, 2007 and entitled "Device, system and method of coordination among wireless transceivers" discloses devices, systems and methods of coordination among wireless transceivers. For example, an apparatus in accordance with an embodiment of the invention includes first and second wireless transceivers, wherein the first wireless transceiver is to enter a non-transmission mode for a pre-defined time period in response to an indication from the second wireless transceiver, and wherein one of the first and second wireless transceivers is to operate in a synchronous network and the other of the first and second wireless transceivers is to operate in a non-synchronous network.

United States Patent Publication No. 20070060055 to Desai; et al. published Mar. 15, 2007 and entitled "Method and system for antenna and radio front-end topologies for a system-on-a-chip (SOC) device that combines BT and IEEE 802.11 b/g WLAN technologies" discloses a method and system for antenna and radio front-end topologies for a system-on-a-chip (SOC) device that combines BT and IEEE 802.11 b/g WLAN technologies. A single chip radio device that supports WLAN and BT technologies receives a WLAN signal in a WLAN processing circuitry of the radio front-end and in a BT processing circuitry of the radio front-end. Signals generated by the WLAN processing circuitry and the BT processing circuitry from the received WLAN signal may be combined in a diversity combiner that utilizes selection diversity gain combining or maximal ratio combining (MRC). When a generated signal is below a threshold value, the signal may be dropped from the combining operation. A single antenna usage model may be utilized with the single chip radio device front-end topology to support WLAN and BT communications.

United States Patent Publication No. 20060274704 to Desai; et al. published Dec. 7, 2006 and entitled "Method and apparatus for collaborative coexistence between BT and IEEE 802.11g with both technologies integrated onto a system-on-a-chip (SOC) device" discloses a method and system for collaborative coexistence between BT and IEEE 802.11g with both technologies integrated onto an SOC device. In a single integrated circuit (IC) that handles BT and WLAN technologies, a WLAN priority level may be selected for WLAN transmissions and a BT priority level may be selected for BT transmissions. The WLAN and BT priority levels may be selected from a plurality of priority levels. A packet transfer scheduler (PTS) may schedule the transmission of WLAN and BT signals in accordance with the selected priority levels. In some instances, the PTS may promote or demote the priority levels for WLAN and/or BT transmissions based on traffic needs.

United States Patent Publication No. 20060133259 to Lin; et al. published Jun. 22, 2006 and entitled "Interference rejection in wireless receivers" discloses a wireless system which mitigates the effects of interference through updating noise variance estimates. Noise variance estimates may be updated after the reception of a preamble in an OFDM receiver.

United States Patent Publication No. 20060084383 to Ibrahim; et al, published Apr. 20, 2006 entitled "Method and system for co-located IEEE 802.11 B/G WLAN, and BT with FM in coexistent operation" discloses a method and system for co-located IEEE 802.11b/g WLAN, and BT (BT) with FM in coexistent operation are provided. A single chip comprising an integrated BT radio and an integrated FM radio in a coexistence station may generate a priority signal to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration. An on-chip processor that time multiplexes FM and BT data processing may be utilized to control the BT radio operation and the FM radio operation in the single chip.

United States Patent Publication No. 20060030266 to Desai; et al. published Feb. 9, 2006 and entitled "Method and system for achieving enhanced quality and higher throughput for co-located IEEE 802.11B/G and BT devices in coexistent operation" discloses a method and system for achieving enhanced quality and higher throughput for co-located IEEE 802.11b/g and BT (BT) devices in coexistent operation are provided. A priority signal may be generated by a BT radio in a coexistence station to disable WLAN transmissions in a WLAN radio when a BT HV3 frame is available for transmission. When the priority signal is asserted, an exponentially growing retransmission backoff mechanism in the WLAN radio may be disabled. Moreover, when the BT radio and the WLAN radio are enabled for coexistence operation, a WLAN fragmentation threshold in the WLAN radio may be modified based on a WLAN modulation rate and the BT HV3 frame duration.

United States Patent Publication No. 20060030265 to Desai, et al. published Feb. 9, 2006 entitled "Method and system for sharing a single antenna on platforms with co-located BT and IEEE 802.11 b/g devices" discloses a method and system for sharing a single antenna on platforms with co-located BT and IEEE 802.11b/g devices. A single antenna may be utilized for communication of BT HV3 frame traffic and wireless local area network (WLAN) communication based on a time multiplexing approach. At least one antenna switch may be utilized to configure an antenna system to enable BT and WLAN coexistence via the single antenna. Configuration signals may be generated by a BT radio device and/or by a WLAN radio device to configure the antenna system. A default configuration for the antenna system may provide WLAN communication between a station and a WLAN access point until BIT communication becomes a priority.

United States Patent Publication No. 20050215197 to Chen, et al. published Sep. 29, 2005 and entitled "Apparatus and methods for coexistence of co-located wireless local area network and BT based on dynamic fragmentation of WLAN packets" discloses an 802.11—enabled device may fragment an 802.11 packet into smaller packets and transmit the smaller packets instead of the 802.11 to lessen interference with BT synchronized connection-oriented communication of a co-located or nearby BT-enabled device.

In another approach, the Cisco Technologies. Inc. Radio Resource Management (RRM) technology is implemented in an Access Point (AP). RRM addresses co-channel interference when two APs use the same channel. In this case, the overall network capacities within these two APs are half of the network capacity if the two channels are assigned with non-overlap channels. The Cisco Dynamic Channel Assignment capability can assign an AP with a different channel to increase network capacity. However, the RRM technology does not address issues with convergence products such as those previously described, and also relies on the AP to manage co-channel interference.

Wireless Network Performance Issues

In addition to interference within a convergence device offering two or more different wireless protocols, the use of these protocols can also affect the performance of the underlying wireless network (e.g. the LAN, PAN, etc.) itself. For example, BT clients operate in the same unlicensed frequency band as other wireless protocol technologies such as Wi-Fi and as multiple BT devices can communicate with a single BT module in the network, BT devices can potentially occupy 100% of the duty cycle for its own PAN network. Further the latest BT technologies only deliver up to about 3 Mbps (extended data rate or EDR, per Bluetooth version 2.0) in the physical layer versus a Wireless LAN device that can easily deliver in excess of 100 Mbps in a Multiple In, Multiple Out (MIMO) system. When two asymmetric or heterogeneous devices exist in the same network (e.g. BT and Wi-Fi), network capacity can often be dominated by the slower device (from the client-side perspective).

Several existing BT stereo headphones operating in Advanced Audio Distribution Profile (A2DP) reserve more bandwidth than is needed for their operation, especially headphones with BT version 1.2 (up to 1 Mbps). As a result, such devices may further reduce network capacity in their operating frequency band that is also shared with the WLAN (assuming that the client prioritizes the A2DP packets). Current network capacity protection schemes, such as a power saving (PS) mode and the CTS2SELF scheme, only work if the BT device has a very limited duty cycle. These schemes cannot prevent BT overuse and misbehavior.

In the context of Wi-Fi, WLAN driver chipsets (such as for example those manufactured by Broadcom, Inc., such as the BCM 4325) typically operate without a power saving mode (e.g., "PM=0") when the underlying device is connected to a power supply (i.e. a 120V/240V wall outlet), and operate in a power saving mode ("PM=2") when the device is operating under battery power. Understandably, this default setting has been desirable in the past for most applications as the users of these WLAN driver chipsets want to efficiently manage both de-vice latency and power consumption to maximize the user experience. While these default settings have their benefits, it is noted that in the context of a device which also utilizes BT, the overall network capacity (LAN, PAN, etc.) suffers as a result of using the default settings in many WLAN driver chipsets. WLAN driver chipset makers have attempted to address WLAN/BT coexistence for a co-located system, and they have also provided several solutions to improve network capacity. However, these prior art attempts assume that BT only has an SCO (synchronous connection-oriented) link, which occupies about a third of the total bandwidth, leaving about two-thirds of the bandwidth to the WLAN. The A2DP duty cycle has not been considered under these models, nor has the combination of multiple BT devices connected to the same system. In essence, these prior art approaches have very limited schemes with the primary aim of assuring BT device operation, as opposed to maintaining a certain quality level for the network(s) as a whole.

Accordingly, improved methods and apparatus are needed for enhancing capacity in networks that comprise two or more wireless technologies that at least partly operate in the same frequency bands. Ideally, such improved methods and apparatus would promote the existence of a "good neighborhood" by monitoring the behavior of wireless modules within a given converged device, as well as the behavior of other devices in, the network, and dynamically adjusting operating behaviors in order to benefit the network as a whole. This holistic approach benefits not only the converged device implementing the policies, but also the broader network.

In the context of an exemplary BT/WLAN coexistence device and network(s), such improved apparatus and methods would ideally implement an an aggressive duty cycle control scheme, and improve network capacity and user experience by monitoring factors such as, inter alia: (1) network traffic, including its own network traffic; (2) the number of clients connected to the network access point (AP); (3) the percentage of traffic going to WLAN; (4) the percentage of traffic going to the BT interface; and (5) the device received signal strength indication (RSSI).

Such improved methods and apparatus would also ultimately provide the users of the network with the best use experience possible by dynamically adjusting the client device duty cycle, while offering converged services in a unified client device in a space- and power-efficient manner.

SUMMARY OF THE INVENTION

The present invention satisfies the foregoing needs by providing, inter alia, methods and apparatus for enhancing network capacity in a wireless system or device with co-existing air interfaces.

In a first aspect of the invention, a method of operating a portable device comprising at least first and second air interfaces that are contentious for at least a portion of a frequency spectrum, the method comprising: operating the first air interface so as to communicate data using the at least portion of the frequency spectrum; operating the second air interface so that it defaults to a power saving mode when not in use, the power saving mode mitigating interference with the first interface within the at least portion of the spectrum.

In one variant, the operation of the second air interface so that it defaults to the power saving mode is conducted irrespective of whether the portable device is coupled to an external power source, or operating only on an internal power source.

In another variant, the operating the first air interface using the at least portion of the frequency spectrum comprises operating a Bluetooth-compliant air interface using a portion of the spectrum located at least proximate to a frequency of 2.4 GHz; and die operating the second air interface comprises operating a Wi-Fi-compliant air interface. The power saving mode comprises e.g., Wi-Fi power saving mode 2 (PM=2).

In yet another variant, the operating the second air interface so that it defaults to a power saving mode when not in use reduces a duty cycle of the second air interface, the reduced duty cycle mitigating the interference, but also adding at least some latency to at least one of data transmission or reception using the second air interface.

In a second aspect of the invention, a method of operating a portable device is disclosed. In one embodiment, the device comprises at least first and second air interfaces that are contentious for at least a portion of a frequency spectrum, and the method comprises operating the second air interface so that it defaults to a power-saving mode of operation regardless of the power supply to the portable device, the power-saving mode resulting in reduced interference with the first air interface when the first air interface is operating in an active mode, the reduced interference comprising a trade-off with an increased latency of active-mode operation of the second interface.

In a third aspect of the invention, network apparatus is disclosed. In one embodiment, the apparatus comprises: a first wireless module in communication with a first network operating according to a first wireless protocol; a second wireless module in communication with a second network operating according to a second wireless protocol, the second wireless protocol, being different than the first wireless protocol; a management module adapted to receive first data relating to a duty cycle of at least one of the first and second wireless protocol modules, the management module adapted to dynamically adjust an operating parameter of at least one of the first and the second wireless protocol modules in response to the received first data.

In one variant, the second wireless module comprises a plurality of operating modes, and the dynamic adjustment of the operating parameter comprises dynamic selection of individual ones of the plurality of operating modes of the second module. For example, each of the plurality of operating modes of the second module comprise a priority level for a given operating profile, the priority level varying between the plurality of operating modes. The first wireless protocol comprises an IEEE-Std. 802.11 wireless protocol, the second wireless protocol comprises a Bluetooth protocol, and the given operating profile comprises the A2DP operating profile.

In a fourth aspect of the invention, a portable device is disclosed. In one embodiment, the device comprises: a first wireless module in communication with a first network operating under a first wireless protocol; a second wireless module in communication with a second network operating under a second wireless protocol; and a management module adapted to receive: first data related to a duty cycle of at least one of the first and second wireless protocol modules; and second data related to an operational profile of the first network. The management module is adapted to dynamically adjust at least one operating parameter of the first or the second wireless protocol modules based at least in part on the first and second data.

In one variant, the operation profile of the first network comprises the number of users on the first network.

In another variant, the management module is configured to select a first operating parameter if the number of users is greater than one, and a select a second operating parameter if the number of users is equal to one.

In a further variant, the operation profile of the first network comprises a received signal strength indication associated with the first network.

In yet another variant, the operating parameter comprises a plurality of discrete modes, at least one of the plurality of discrete modes disabling an operational profile or mode of the second wireless module.

In a further variant, the first wireless protocol comprises an IEEE-Std. 802.11 wireless protocol, the second wireless protocol comprises Bluetooth, and the operational profile or mode comprises the A2DP operational profile.

In still another variant, the first module comprises a Wi-Fi module, the second module comprises a Bluetooth module, and the portable device comprises a laptop or handheld computer having a clamshell-like outer housing, the maximal thickness of the housing when in a closed state being less than 0.80 inches.

Alternatively, the first module may comprise a Wi-Fi module, the second module comprises a Bluetooth module, and the portable device comprises a handheld computerized device having a cellular telephony interface and a touch screen user interface.

In a fifth aspect of the invention, a portable computerized apparatus adapted for powering by a fixed power supply or a portable power supply is disclosed. In one embodiment, the apparatus comprises: a first wireless module adapted for communication with one or more external devices using a first wireless protocol; a first management module in signal communication with the first wireless module; and a second wireless module adapted for communication with one or more external devices using a second wireless protocol, the second wireless protocol different than the first wireless protocol. The first management module comprises a default value comprising a power saving mode, the default value implemented whether or not the portable computerized apparatus is powered by the fixed power supply or the portable power supply.

In one variant, the first wireless protocol comprises a Bluetooth protocol, and the second wireless protocol comprises a Wi-Fi protocol.

In a sixth aspect of the invention, a method of enhancing network capacity is disclosed. In one embodiment, the method comprises: determining an amount of network traffic existing on at least one network of a plurality of networks, wherein each network in the plurality of networks operates in a portion of a frequency spectrum that overlaps with that of the other; and adjusting the amount of resources allocated to applications requesting access to at least one of the plurality of networks, wherein the adjustment is based at least in part upon the act of determining.

In one variant, the plurality of networks comprises two wireless networks using heterogeneous wireless protocols. For example, the heterogeneous wireless protocols may comprise a Bluetooth protocol and a Wi-Fi protocol, and the at least portion of the spectrum comprises approximately 2.4 GHz.

In another variant, the amount of network traffic comprises the number of users on the at least one network.

In yet another variant, the amount of network traffic comprises a duty cycle of a device operating in the at least one network.

In a further variant, the acts of determining and adjusting are performed by a single device. Alternatively, the acts of determining and adjusting may be performed by two different devices. As yet another alternative, the act of determining is performed wholly by a first of the two different devices, and the adjusting is performed wholly by a second of two different devices. One of the two different devices comprises e.g., an access point or gateway for the other discrete device to another network.

In a seventh aspect of the invention, a computer readable apparatus is disclosed. In one embodiment, the apparatus comprises a storage medium adapted to store a plurality of instructions which, when executed by a computerized device, perform the method comprising: evaluating the usage of a first wireless module in signal communication with a first network; and modifying the behavior of a second wireless module based at least in part on the act of evaluating, the modifying mitigating interference between the first and second modules.

In one variant, evaluating the usage comprises: determining a duty cycle associated with a first wireless module; evaluating the duty cycle to determine whether it exceeds a threshold value; and if the threshold value is exceeded, performing the modifying, the modifying comprising reducing a duty cycle of the second module.

In another variant, the method further comprises evaluating the usage of the second module, and the act of modifying comprises modifying based on the evaluating of both the usage of the first module and the usage of the second module.

In yet another variant, the method further comprises determining an indication related to a received signal strength for the computerized device.

In another variant, the method further comprises: comparing the indication of the received signal strength to a threshold value; and determining the number of clients in communication with an access point of the first network if the indication exceeds the value. Determining the number of clients comprises for example: sending a message or signal to an access point or gateway of the first network; and receiving a message or signal in response to the sending, the received message or signal comprising data relating to the number of clients.

In an eighth aspect of the invention, a method of operating a portable wireless device comprising a plurality of differing wireless modules is disclosed. In one embodiment, each module operates at least party within a same frequency spectrum, and the method comprises: implementing a default power save mode for a first of the plurality of wireless modules of the device; implementing a first operating parameter for a second of the modules; evaluating a receiver signal strength associated with the first wireless module against a predetermined threshold; evaluating a first duty cycle parameter associated with the first wireless module; evaluating a second duty cycle parameter associated with the second wireless module; and adjusting the first operating parameter based at least in part on at least one of the acts of evaluating.

In a ninth aspect of the invention, an access point adapted to communicate with a plurality of client devices within a wireless network is disclosed. In one embodiment, the access point comprises: first logic adapted to evaluate usage within the first wireless network; and second logic adapted to cause communication with at least one of the plurality of client devices, the communication causing the at least one device to modify the operational behavior of a second air interface thereof which is not part of the first wireless network.

In one variant, the first network comprises a Wi-Fi network, the second air interface comprises a Bluetooth-compliant interface, and the modification of the operational behavior comprises dynamically selecting one of a plurality of operating modes associated with the Bluetooth-compliant interface.

In a tenth aspect of the invention, methods of doing business based on the aforementioned apparatus and techniques are also disclosed.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1A:
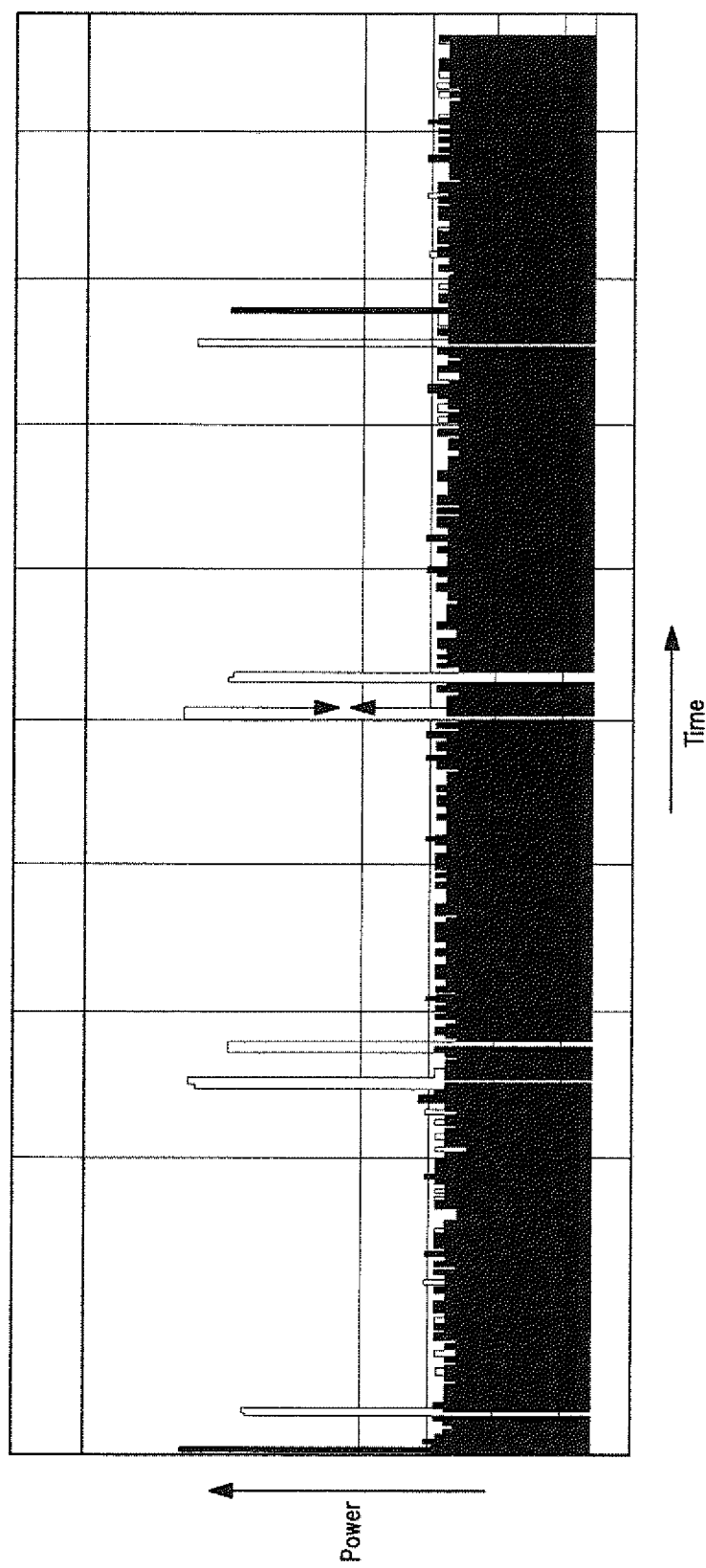
FIG. 1A illustrates the radio frequency (RF) duty cycle associated with a typical Bluetooth (BT) peripheral device such as a BT mouse or BT keyboard.

As used herein, the term "Bluetooth" refers without limitation to any device, software, interface or technique that complies with one or more of the Bluetooth technical standards, including Bluetooth Core Specification Version 1.2, Version 2.0, and Version 2.1+EDR.

As used herein, the terms "client device" and "end user device" include, but are not limited to, personal computers (PCs), such as for example an iMac™, Mac Pro™, Mac Mini™, MacBook™ or MacBook™ Air, and minicomputers, Whether desktop, laptop, or otherwise, as well as mobile devices such as handheld computers, such as for example an iPhone™, PDAs, video cameras, set-top boxes, personal media devices (PMDs), or any combinations of the foregoing.

As used herein, the term "co-located" refers to two or more devices or components which are physically proximate to one another; for example, so as to cause at least some level of interference with the operation of at least one of the devices/components.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (BREW), and the like.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein the terms "network" and "bearer network" refer generally to any type of data, telecommunications or other network including, without limitation, data networks (including MANs, PANs, WANs, LANs, WLANs, micronets, piconets, internets, and intranets), hybrid fiber coax (HFC) networks, satellite networks, cellular networks, and telco networks. Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, 802.11, 802.20, ATM, X.25, Frame Relay, 3GPP, 3GPP2, WAP, SIP, UDP, FTP, RTP/RTCP, H.323, etc.).

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), WiMAX (802.16), PAN (802.15), or IrDA families.

As used herein, the term "Wi-Fi" refers to, without limitation, any of the variants of ANSI/IEEE-Std. 802.11 ("Information technology—Telecommunications and information exchange between systems—Local and metropolitan area networks—Specific requirements—Part 11: Wireless LAIN Medium Access Control (MAC) and Physical Layer (PHY) Specifications") or related standards including 802.11 a/b/e/g/n, each of the foregoing being incorporated herein by reference in its entirety.

As used herein, the term "wireless" means any wireless signal, data, communication, or other interface including without limitation Wi-Fi, Bluetooth™, 3G, HSDPA/HSUPA, TDMA, CDMA (e.g., IS-95A, WCDMA, etc.), FHSS, DSSS, GSM, PAN/802.15, WiMAX (802.16), MWBA (802.20), narrowband/FDMA, OFDM, PCS/DCS, analog cellular, CDPD, satellite systems, millimeter wave or microwave systems, acoustic, and infrared (i.e., IrDA).

Overview

The present invention discloses, inter alia, methods and apparatus for enhancing the operation and capacity of a network having associated devices with multiple air interfaces that share bandwidth within a spectral (frequency) band. For example, many portable computing or electronic devices utilize multiple air interfaces for different purposes (e.g., WLAN and PAN), yet these interfaces may interfere with one another (and those of other proximate devices) under certain circumstances. This interference can adversely impact the performance and user experience of the affected devices, such as by reducing WLAN data rates.

In one variant of the present invention, the improved portable device is made to operate in a power-saving mode at all times (irrespective of whether the device is utilizing battery power, DC power supplied from an AC wall or inductive converter, or both), such that the WLAN interface must in effect be "woken up" whenever a data transmission/reception of significance is required. This way, the WLAN's use of the conflicting frequency spectrum (e.g., 2.4 GHz) is minimized in favor of use of that same spectrum by the client's BT device(s) such as wireless headset, mouse, keyboard, etc.

In another variant, the foregoing interference mitigation scheme is further enhanced by management of various operational modes for the BT interface, in effect throttling the BT interface's use of the spectrum when such use would negatively impact WLAN use of the spectrum by the device, or other WLAN users in proximity (e.g., on the same AP). This management scheme can be made dependent upon one or more operational criteria, such as for example the level of network traffic, number of user, and so forth. Depending on these operational criteria, differing operating rules are implemented so as to achieve the goal of providing the users of the network with the best overall user experience possible, and having their devices act as "good neighbors" to other local devices by minimizing interference within the common spectrum.

In the context of one exemplary WLAN/BT implementation, the portable or client device proactively monitor its own network traffic as well as optionally seek out information regarding the number of clients connected within the same network (i.e. number of users connected to an AP) as well as monitor its own received signal strength indication (RSSI). The device determines how much of its network traffic goes between the two competing wireless protocols, and adjusts its WLAN/BT coexistence scheme accordingly. This exemplary implementation also provides a seamless user experience, allowing for an effectively invisible and automatic dynamic optimization by the device (or alternatively one with any degree of user/developer involvement that is desired, such as via a software-based user interface).

The present invention may also be used in complementary fashion to the exemplary solutions for mitigating the effects of co-existing air interfaces (in the context of a single device) that are described in co-owned and co-pending U.S. patent application Ser. No. 12/006,992 entitled "Method and Apparatus for Wireless Device Coexistence", previously incorporated herein. Specifically, various aspects of the present invention extend the sphere of management consideration beyond just the individual client device, and to the local wireless network as a whole (including as noted above other wireless devices that are part of the same local network), thereby providing a device not only whose internal multiple air interfaces are more harmonious with one another, but which also enforces harmony with other devices on the network.

Detailed Description of Exemplary Embodiments

Exemplary embodiments of the present invention are now described in detail. While these embodiments are primarily discussed in the context of BT and WLAN coexistence scheme, it will be recognized by those of ordinary skill that the present invention is not limited to any two particular wireless protocols. In fact, the principles discussed herein are equally applicable to any number of wireless protocols which at least partly share frequency spectrum, and with which antenna isolation or spectrum bandwidth problems occur as a result of the two wireless protocol implementations being substantially co-located with one another. For example, the Apple TV™ digital media receiver sold and marketed by the Assignee hereof, utilizes both WLAN 802.11 and wireless universal serial bus (USB) air interfaces. The WLAN and wireless USB interfaces share the same spectrum (i.e., ISM band), and hence could also benefit from the coexistence solutions discussed subsequently herein. Myriad other combinations of different air interfaces utilizing at least a portion of the same spectrum will also be recognized by the ordinary artisan given this disclosure.

Moreover, while discussed primarily in the context of a basic two-interface or protocol topology, it is recognized that other topologies (e.g., three-protocol, etc.) may be used consistent with the invention. For instance, WLAN, BT, and wireless USB could conceivably be used simultaneously and could benefit from the coexistence solutions discussed subsequently herein. Such a system might integrate e.g., WLAN for wireless networking, BT for personal area devices, FTP, or networking (PAN), and wireless USB (for remote controller, HID mouse and keyboard), etc., all within the same portable device.

Additionally, it will be appreciated that the methods and apparatus of the invention may be applied to situations where more than two interfaces are co-located or proximate, but not necessarily operated all at the same time. For instance, in one variant of the invention, a user device is configured with three (3) distinct air interfaces (labeled "A", "B" and "C" for purposes of this discussion), yet the most common operating mode for the user device is where only two of the three interfaces are operated simultaneously. Depending on which of the three interfaces are being operated at a given time, the policies or rules applied may be different. For example, interface A might have significant mutual interference issues with interface B, but not with interface C. Similarly, interface C might have significant issues with interface B, but not A. So, the present invention explicitly contemplates the dynamic selection and application of one or more operating policies or configurations based on a determination of which interfaces are operating at a given time.

Exemplary Bluetooth Device Duty Cycles—

Referring now to FIGS. 1A-1E, exemplary duty cycles associated with various Bluetooth-enabled devices commonly used with computerized devices are shown and described in detail. These duty cycles were obtained by the Assignee hereof using an Agilent Technologies EPM-P Series Power Meter Analyzer, although it will be recognized that such duty cycles and Analyzer are merely illustrative of the broader principles of the invention.

Specifically, FIG. 1A illustrates the power output of a BT-enabled peripheral device (i.e. mouse/keyboard). Of particular significance with respect to FIG. 1A is that the peripheral device duty cycle only occupies about 0.143 ms out of every 11.25 ms of time, and that its usage is quite regular (periodic) when the peripheral device is active. Hence, the illustrated device has a comparatively small and highly regular spectral "footprint" when in use.

Figure 1B:
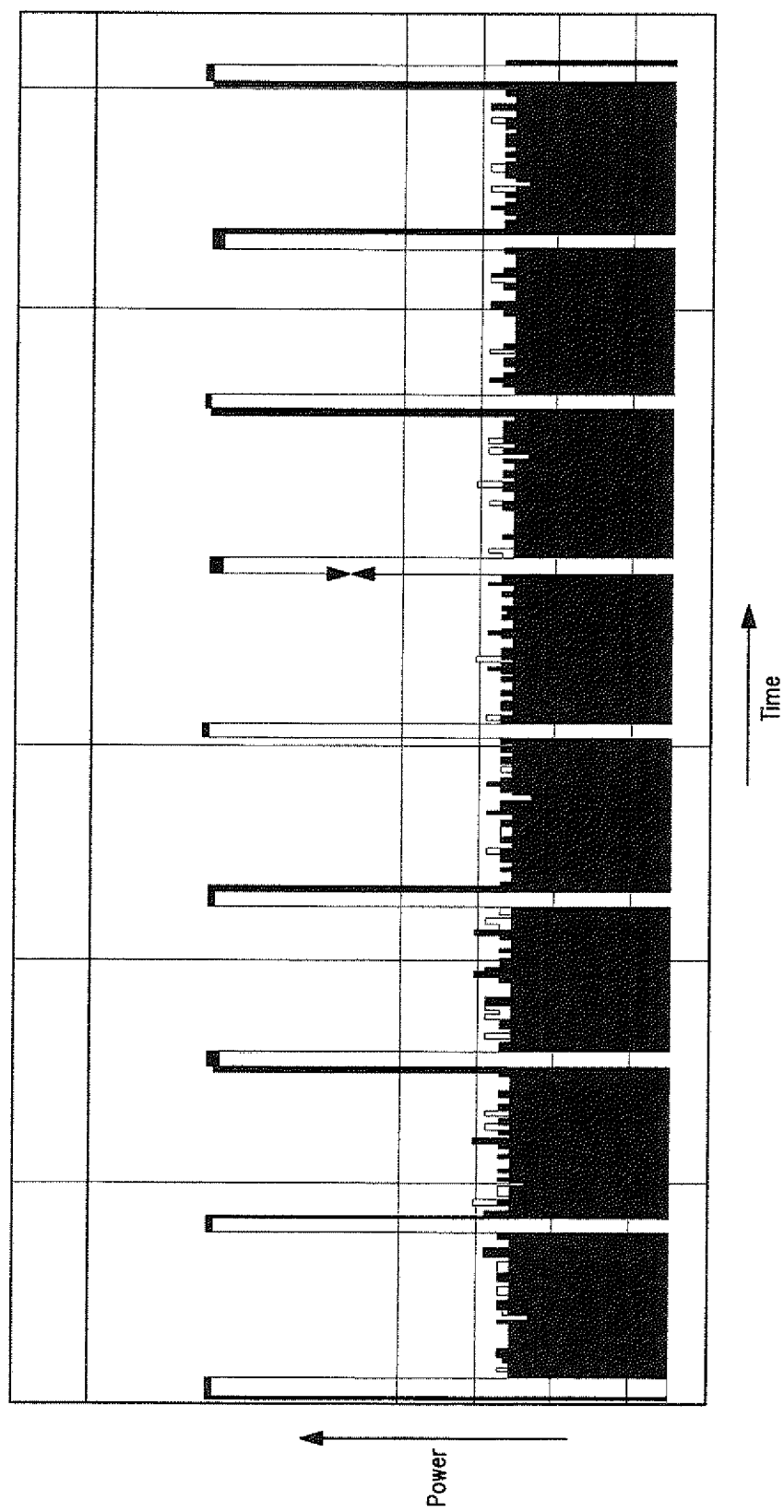
FIG. 1B illustrates the radio frequency (R) duty cycle associated with a typical BT headset utilizing a Synchronous Connection Oriented (SCO) protocol link.

FIG. 1B illustrates a BT device (such as a headset) operating with a Synchronous Connection Oriented (SCO) link. As is well known, SCO comprises one of the two BT data link types defined in the BT specification(s). This type of link is used primarily to transport SCO packets (voice data) that do not include a cyclic redundancy check (CRC) and are never retransmitted. A BT SCO link possesses about a one-third (⅓) duty cycle, as it normally uses HV3 packets that occupy 2 slots of every 6 available (²/₆=⅓). As with the device of FIG. 1A, the duty cycle of the BT SCO link of FIG. 1B is quite regular when the peripheral device is active, albeit with a larger footprint.

Figure 1C:
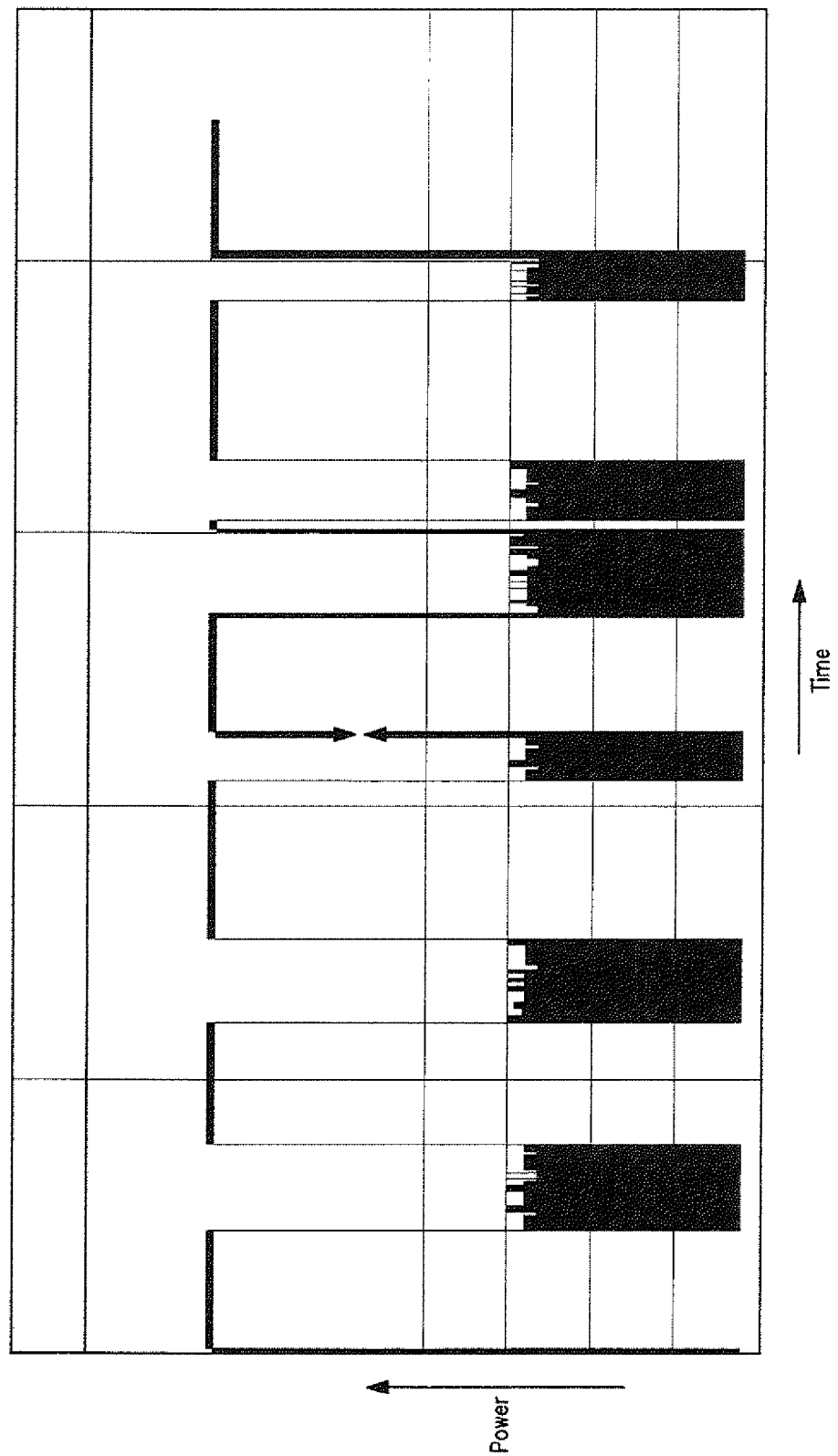
FIG. 1C illustrates the radio frequency (RF) duty cycle associated with one exemplary BT headset utilizing the Advanced Audio Distribution Profile (A2DP) protocol.
Figure 1D:
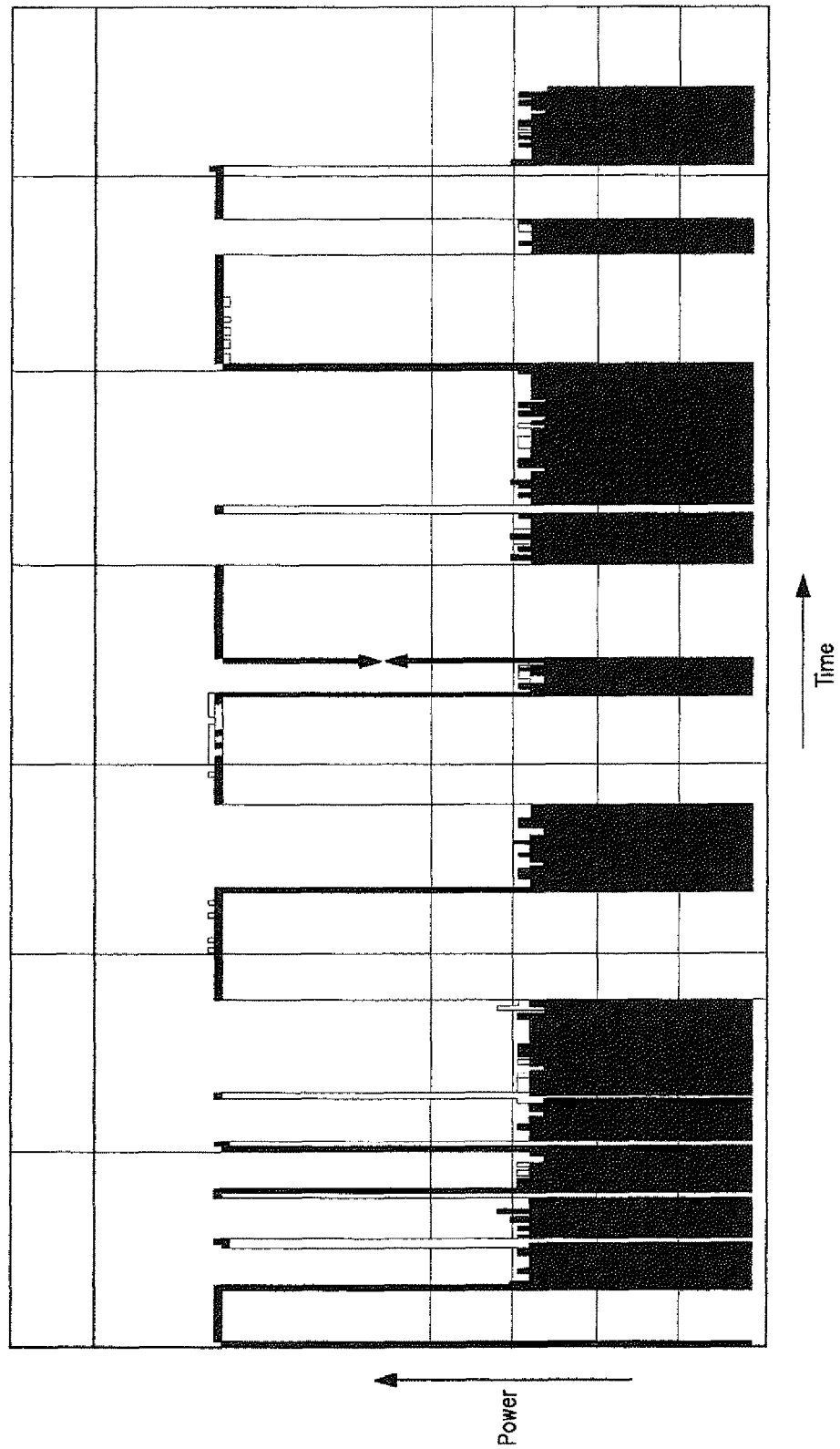
FIG. 1D illustrates the radio frequency (RF) duty cycle associated with a second BT headset utilizing the A2DP protocol.
Figure 1E:
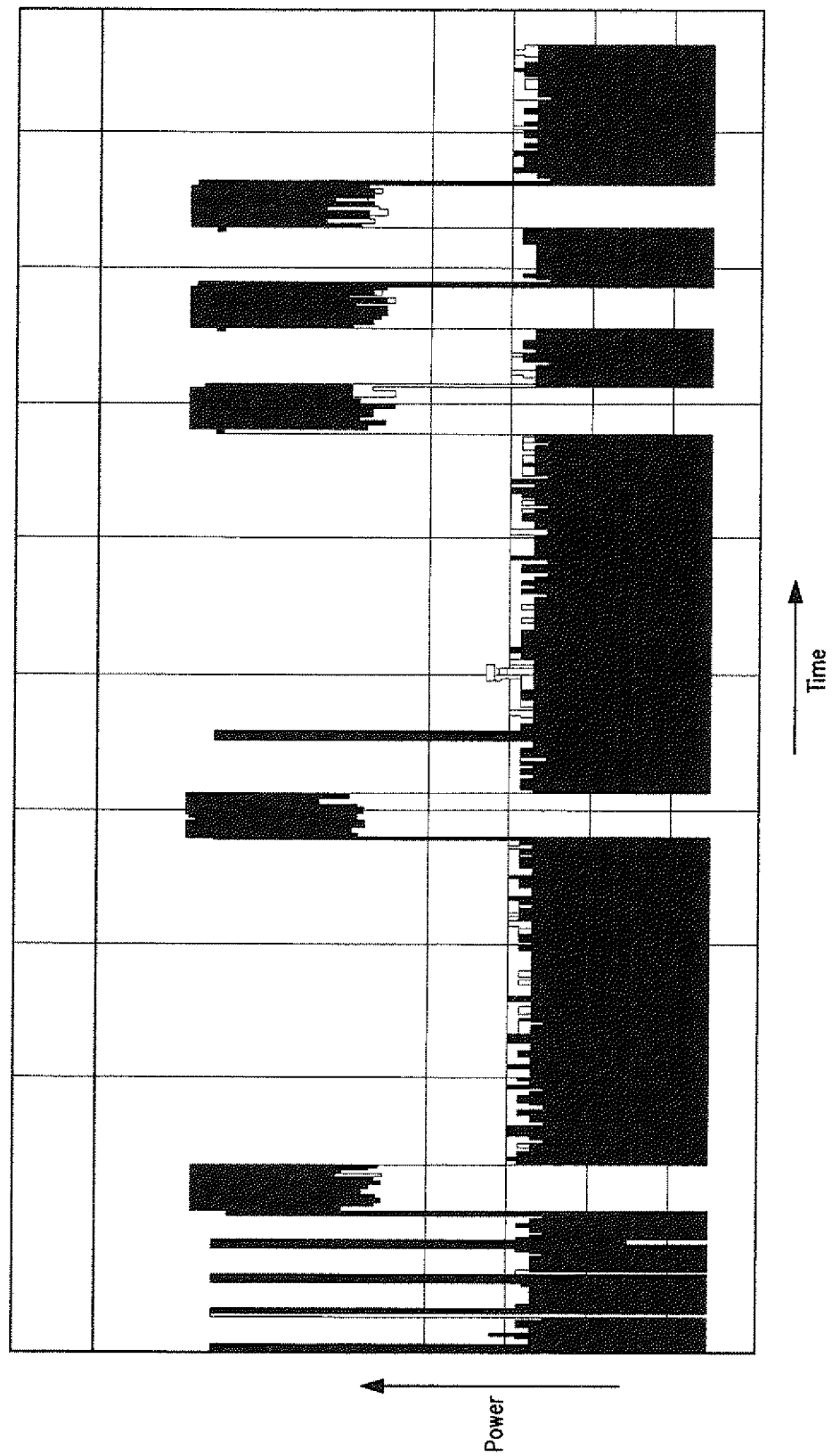
FIG. 1E illustrates the radio frequency (RF) duty cycle associated with a third BT headset utilizing the A2DP protocol.

FIGS. 1C-1E illustrate various BT headset devices operating with an Advanced Audio Distribution Profile (A2DP). A2DP devices and their duty cycles are highly dependent on the individual vendor's implementations. The A2DP defines how high-quality audio may be transferred over a BT connection, and is designed for example to transfer a two-channel audio stream. As can be seen from FIGS. 1C-1E, the duty cycle can vary anywhere from 20% of duty cycle (for an exemplary Dell Inc. BT 2.0 EDR headset in FIG. 1E) to over 60% of duty cycle (Jabra BT 1.2 headset of FIG. 1C). FIG. 1D (Plantronics BT 1.2 headset) shows yet another exemplary duty cycle. Also of note with respect to FIGS. 1C-1E is the fact that usage is quite irregular when the peripheral device is active.

Apparatus and System—

Figure 2:
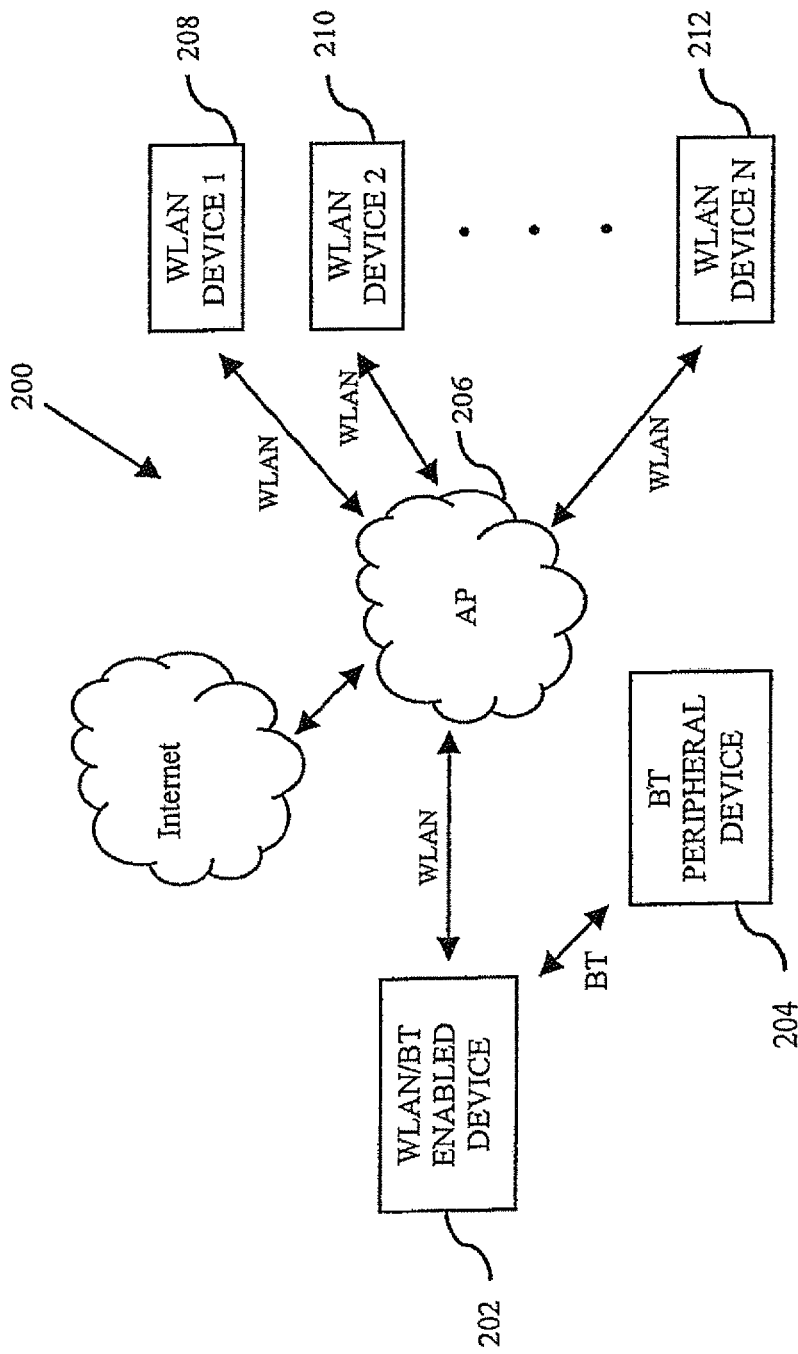
FIG. 2 is block diagram illustrating an exemplary network architecture utilized in connection with the network enhancement apparatus of the present invention.

Referring now to FIG. 2, exemplary network architecture 200 utilized in conjunction with the apparatus and methods of the present invention are shown and described in detail.

In the network architecture 200 shown, a WLAN access point (AP) 206 provides services to a plurality of WLAN STA devices 208, 210, 212. A WLAN/BT enabled client device 202 also is being serviced by the AP 206. One or more BT peripheral devices 204 are also co-located with the network 200 (i.e., within BT communication range, typically about 30 feet or so depending on conditions) and in communication with the WLAN/BT enabled client device 202.

In addition, while FIG. 2 illustrates a single WLAN/BT enabled client device 202, it is envisioned that the present invention would be useful in the context of a network architecture where multiple WLAN/BT enabled client devices 202 were utilized.

Further, as discussed subsequently herein, the present invention is useful in architectures wherein a single WLAN/BT enabled client device is utilized in a network with out other WLAN STA devices present.

Referring now to FIGS. 2A-2D, exemplary apparatus 230, 250, 270, 290 implementing co-located WLAN/BT modules with network capacity enhancement apparatus are shown and described in detail. These apparatus 230, 250, 270, 290 will generally be implemented within a single client device (e.g., laptop computer, smartphone, PDA, etc.) such that the WLAN module 240 and the BT module 246 are substantially co-located with one another. However, it will be recognized that the different modules may also reside in different physical devices which themselves are proximate to one another. These differing architectures are examples of apparatus useful for implementing the methodology of the present invention discussed subsequently herein below.

Figure 2A:
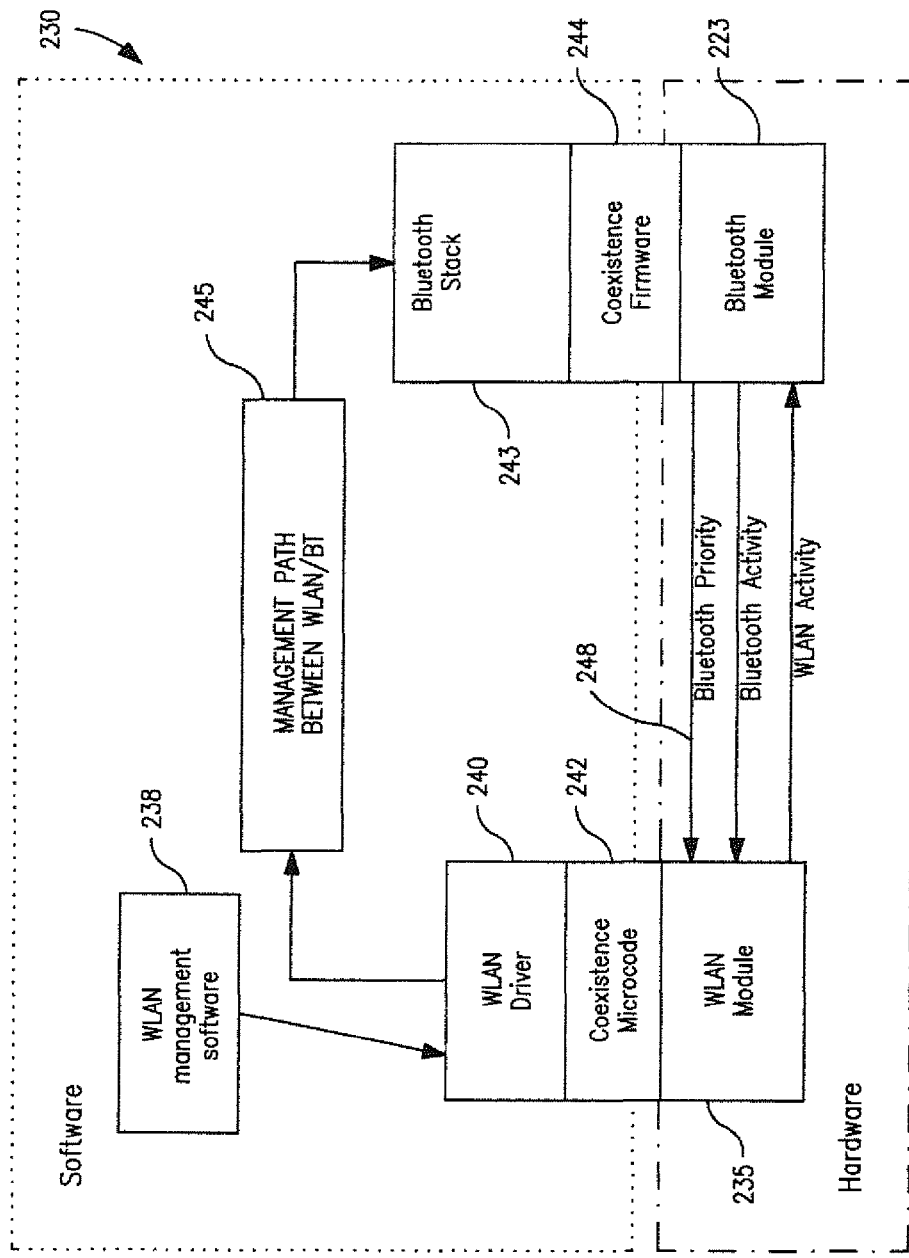
FIG. 2A is a functional block diagram illustrating a first exemplary WLAN/BT enabled apparatus utilizing interference effects mitigation, and being adapted for network capacity enhancement in accordance with the principles of the present invention.

The client device apparatus 230 shown in FIG. 2A comprises combined software 232 and hardware 234 elements which together dynamically manage the duty cycle of the device with both the air interfaces (e.g., WLAN module 235 and BT module 236) operating in close spatial proximity to one another. The software portion 232 of the apparatus 230 comprises management software 238, a WLAN driver 240, and coexistence microcode 242 for WLAN, as well as a BT stack 243, and coexistence firmware 244 for BT. A management path 245 between the software portions of the WLAN and BT portions of the system 230 is also provided, in one variant, the aforementioned management path 245 comprises a software interface (e.g., API) of the type well known in the software arts, although other approaches may be used as well.

The management software 238 can, handle a plurality of management functions such as, e.g. implementing a power-saving mode (PSM) for the WLAN module 235 of the type previously described herein. The WLAN driver 240 is in communication with the management software 238 so that the software 238 can implement the desired PSM. As is well known, the WLAN driver 240 acts as a communication interface between higher level computer processes (such as the WLAN management software 238) with the WLAN hardware. The WLAN module 235 itself acts as the physical hardware necessary to implement the WLAN air interface functionality.

On the BT side of the illustrated apparatus of FIG. 2A, the BT software stack 243 comprises an implementation of the BT protocol (see, e.g., BT Core Specification v2.1+EDR dated Jul. 26, 2007 {Bluetooth SIG}, incorporated herein by reference in its entirety), thereby allowing flexible implementation of a plurality of different BT profiles. These profiles can include for example software for a BT enabled headset, or for a BT enabled I/O device such as a keyboard or mouse; see, e.g., BT Advanced Audio Distribution Profile 1.2 dated 16 Apr. 2007; BT Audio/Video Remote Control Profile 1.3 dated 16 Apr. 2007; BT Basic Imaging Profile (BIP) dated 25 Jul. 2003; BT Basic Printing Profile (BPP) 1.2 dated 27 Apr. 2006; BT Common ISDN Access Profile (CIP) dated 16 Nov. 2002; BT Cordless Telephony Profile (CTP) dated 22 Feb. 2001; and BT Device Identification Profile (DI) 1.3 dated 26 Jul. 2007, each of the foregoing incorporated herein by reference in its entirety. Other profiles may be used as well.

The BT stack 243 is further in communication with coexistence firmware 244, the latter which is communication with the BT module 236. The BT module 236 comprises the BT radio hardware (PHY). The BT stack 243 is also in communication with the management software 238. The management software 238 is able to implement aggressive duty cycle control schemes (e.g. btc_mode=0, 1, 2, etc.) for the BT module 236 as will be discussed more fully subsequently herein.

Another feature of the apparatus 230 of FIG. 2A is the software communications management path 245 between the WLAN and BT. This is significant, in that it permits the implementation of a closed-loop solution between the WLAN module 235 and the BT module 236 for managing interference within the device 230 itself. In the illustrated embodiment, this management path 245 permits the BT module to read the WLAN channel, as well as permit the management software to send an AFH (adaptive frequency hopping) command to the BT module 236. While the present embodiment illustrates a one-way communications path between WLAN and BT systems, it is further envisioned that in some embodiments it may be desirable to have this software communications path 245 be bi-directional. Moreover, other types of management inputs are envisioned, including for example inputs as to the status of other modules or processes within the host device.

In terms of a hardware communications path between the WLAN module 235 and the BT module 236, FIG. 2A illustrates an exemplary 3-channel (e.g., 3-wire) solution. This solution, as well as the closed-loop solution disclosed above, is described in co-owned and co-pending U.S. patent application Ser. No. 12/006,992 filed Jan. 7, 2008 and entitled "Method and Apparatus for Wireless Device Coexistence" previously incorporated herein. Other approaches may be used with equal success, however, consistent with the present invention.

Figure 2B:
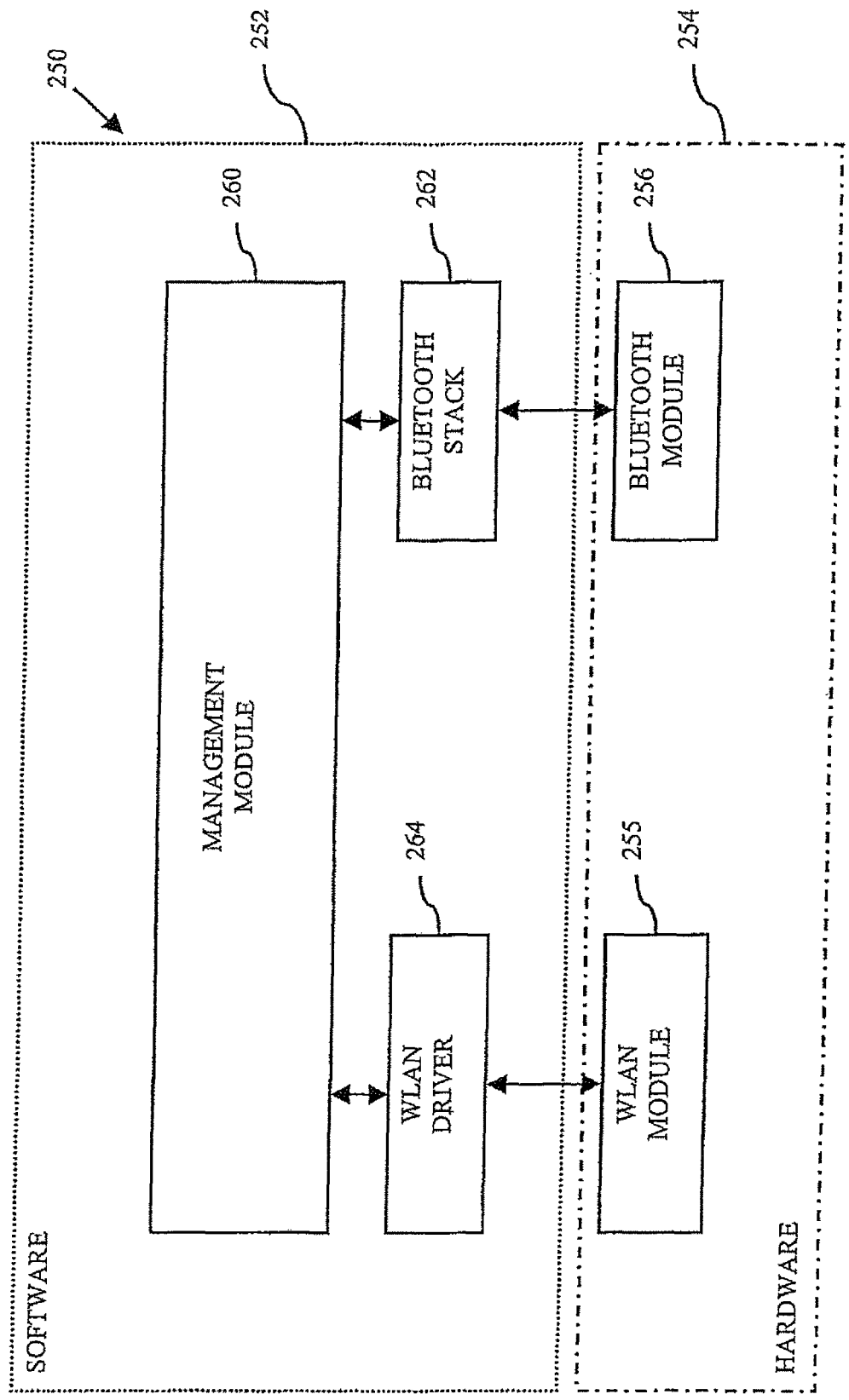
FIG. 2B is a functional block diagram illustrating an exemplary WLAN/BT enabled apparatus adapted for network capacity enhancement in accordance with the principles of the present invention.

Referring now to FIG. 2B, another exemplary apparatus 250 for implementing WLAN/BT coexistence with network capacity enhancement features is shown and described in detail. The apparatus 250 or client device comprises a software 252 and hardware 254 portion similar to the apparatus 230 discussed above with reference to FIG. 2A. The hardware portion 254 comprises a WLAN module 255 as well as a BT module 256. These modules 255, 256 comprise the radio inter-faces (PHYs) for the underlying network. Within the software portion 252, a WLAN driver 264 is in signal communication with the WLAN module 255, while a BT stack 262 is in communication with the BT module 256. Note that in contrast to the previous embodiment discussed, the apparatus 250 of the present embodiment does not provide any direct physical or logical communication paths between the two wireless protocols/modules. The management module 260 is in communication with both the WLAN driver 264 and BT stack 262 in order to provide the network capacity enhancement features (e.g., "good neighbor policy") discussed further herein, below.

Figure 2C:
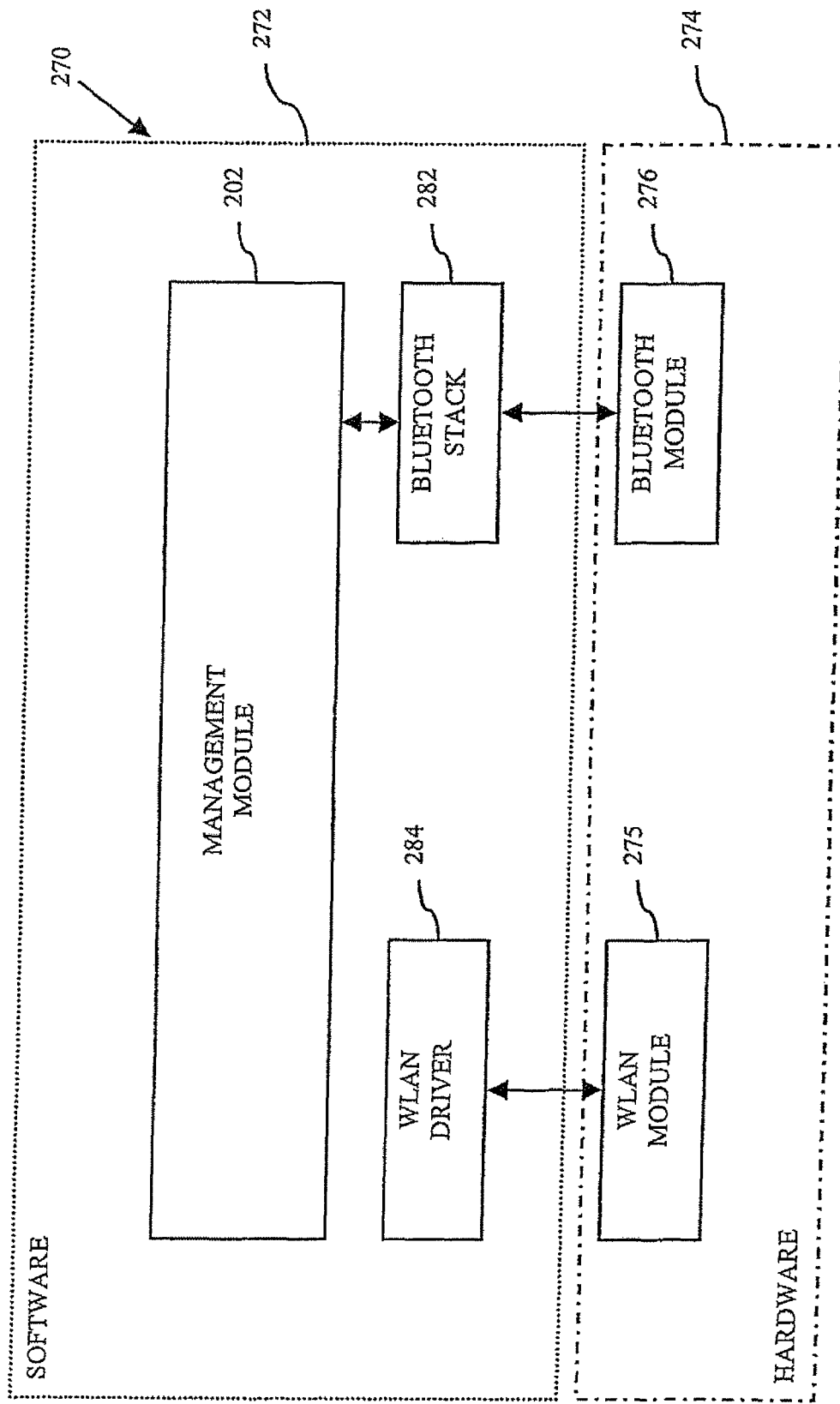
FIG. 2C is a functional block diagram illustrating a second exemplary WLAN/BT enabled apparatus adapted for network capacity enhancement in accordance with the principles of the present invention.

FIG. 2C illustrates yet another embodiment of an apparatus 270 useful for implementing the network capacity enhancement features of the present invention. The apparatus 270 is generally similar in logical function to the device of FIG. 2B. However, in the embodiment of FIG. 2C, the WLAN module 275 is implemented so that it operates essentially independent of the management module 280. The WLAN driver 284 may for instance operate in the power saving mode (e.g., PM=2) as the default mode, without regard to direct input from the operation of the co-located BT module 276. Here, the management module 280 operates only in signal communication with the BT stack 282, and implements the BT duty cycle control scheme.

In an alternative embodiment (not shown), the apparatus 270 of FIG. 2C may be implemented in such a way that the management module 280 may pull information from the WLAN portion of the device, but may not be permitted to change any configuration settings for the WLAN driver 284.

Advantageously, the foregoing embodiments of FIGS. 2A-2C are all effectively "self contained" on the client side; i.e., do not require any additional support or infrastructure from the AP or other network components outside the client device. This allows for inclusion of the WLAN/BT management apparatus and functionality directly into the client devices, with no infrastructure or other network upgrades required, thereby greatly simplifying implementation of the technology.

Figure 2D:
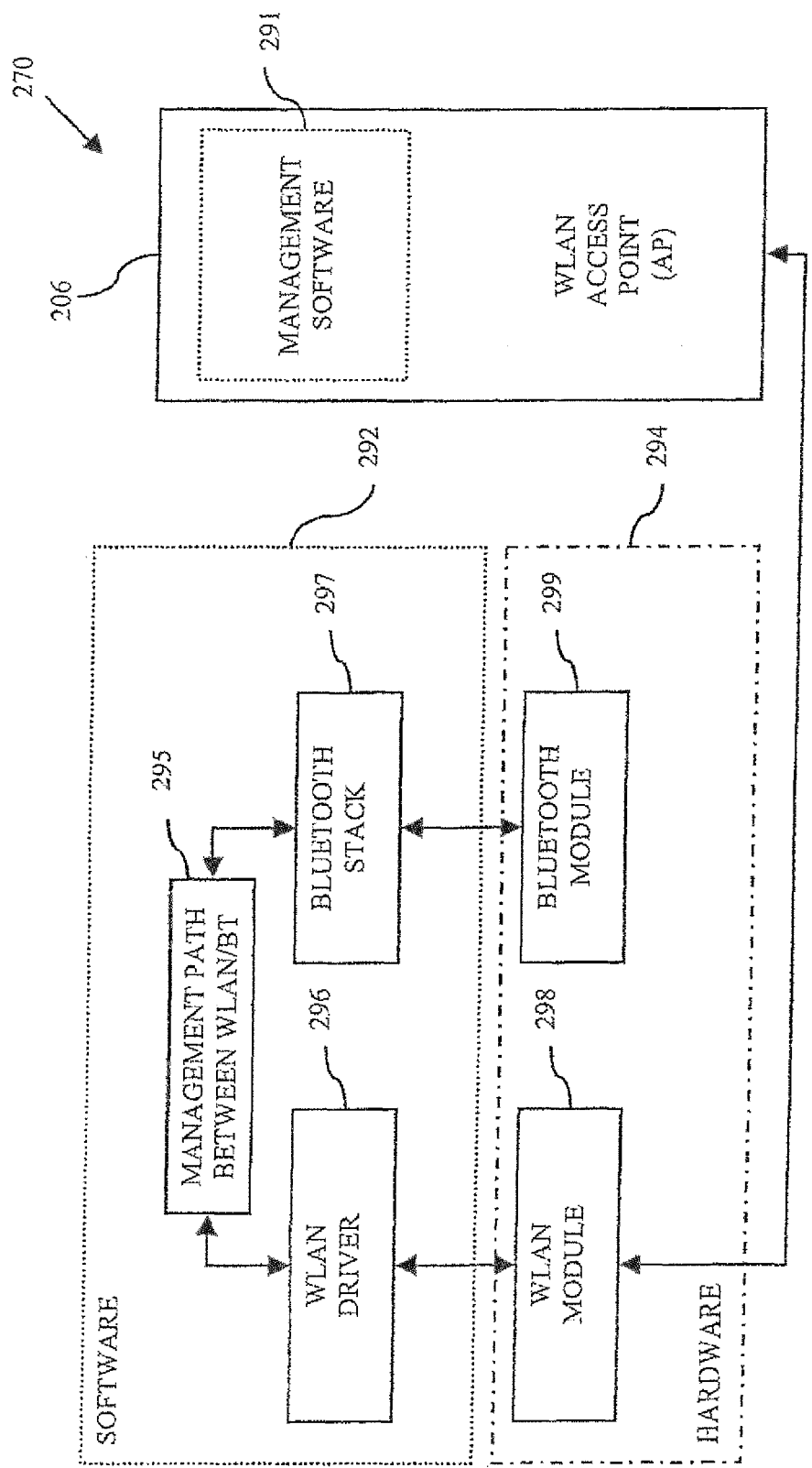
FIG. 2D is a functional block diagram illustrating a third exemplary WLAN/BT enabled apparatus in communication with an access point (e.g., Wi-Fi AP) comprising network capacity enhancement in accordance with the principles of the present invention.

FIG. 2D, illustrates yet another embodiment of an apparatus 290 useful for implementing the network capacity enhancement features of the present invention. While previous embodiments have illustrated the management software located in the client device 230, 250, 270, the embodiment of FIG. 2D places the management software 291 within the WLAN AP 220. The apparatus 290 comprises a software 292 and hardware portion 294 similar to the embodiments discussed previously. Further, a management path 295 between the WLAN driver 296 and the BT stack 297 exists in order to communicate control information and/or data between the two wireless protocols. As will be discussed more fully herein below, the BT stack 297 (or other high level software process) will issue a request for a reservation of an allocation of network capacity. The request will be communicated via the WLAN module 298, wherein the management software 291 located within the AP 320 will either grant or deny such a request by the BT stack 297. In this manner, the AP acts as the "manager" of the network so as to implement a policy that benefits everyone within the network.

The management software 291 may further interact with various other devices within the WLAN network (e.g., other WLAN devices 208, 210, or WLAN/BT devices 202, such as shown in FIG. 2 herein) to implement (i) AP-wide policies on BT/WLAN spectrum usage, or (ii) individual control of WLAN/BT devices 202 so as to cause all such users within the purview of the AP to enforce "good neighbor" behavior (i.e., their BT interfaces do not unduly burden or preempt the frequency spectrum use by the WLAN interfaces of those devices 202).

Methods—

Methods of operating the apparatus (e.g., WLAN/BT client devices 230, 250, 270, and 290) discussed above with respect to FIGS. 2A-2D are now described in detail.

As referenced previously herein, two primary variants of the apparatus exist: (i) a first variant wherein the client device operates in power-saving mode at all times (irrespective of whether the device is utilizing battery power, DC power supplied from an AC wall or inductive converter, or both), such that the WLAN interface must in effect be "woken up" whenever a data transmission/reception of significance is required; and (ii) a second variant wherein the foregoing scheme is further enhanced by management of various operational modes for the BT interface, in effect throttling the BT interface's use of the spectrum when such use would adversely impact WLAN use of the spectrum by the client device, or other WLAN users in proximity (e.g., on the same AP). These two variants are now discussed individually.

First Variant (Power-Saving Default Mode Alone)—

With regards to the apparatus discussed with reference to, for example, FIG. 2C above, it has been observed that a communication pathway between a management module 280 and the WLAN driver 284 is not necessary in many cases to enhance network capacity. Specifically, it has been found that by operating the WLAN interface (driver 284 and module 275) in a power saving mode as a default mode of operation (e.g., PM=2), general network capacity has been adequate for both the WLAN/BT client device 202 as well as other users 208, 210, 212 on the WLAN network 200 of FIG. 2.

As was discussed previously, prior art WLAN driver chipsets (ICs) typically operate without a power-saving mode (PM=0) when the underlying device is connected to a power supply (e.g., a 120V/240V AC-DC wall outlet), and operate in a power saving mode (PM=2) when the device is operating on battery power alone. Hence, operating the WLAN driver with PM=2 as the default mode of operation in all conditions, even when the client device 202 is connected to a "limitless" power supply such as an AC-DC converter, is somewhat counterintuitive.

Various operating "test" cases performed by the Assignee hereof for the power-saving mode as the default mode of operation are now discussed in detail. These test cases illustrate, albeit not exhaustively, the various combinations of WLAN and/or BT operations between the devices 202, 208, 210, 212 of FIG. 2. It is noted that the test results discussed herein were all conducted when both the client device 202 and the other client devices 208, 210, 212 were operated in a network 200 where the RSSI (received signal strength) was between −60 and −65 dBm.

In a first test case, the client device 202 is idle (i.e. no BT or WLAN activity), and the other devices 208, 210, 212 were as would be expected able to download data (such as an MP3 from the Assignee's iTunes™ store) using their respective WLAN interfaces at a consistent and desirable data rate (e.g. 2 Mbps).

In a second test case, the client device 202 is idle with regards to its BT activity, and both the client device 202 and other devices 208, 210, 212 were able to download data via the AP 306 at a consistent and desirable data rate (e.g. 1 Mbps), albeit less than the previous case due to more WLAN clients operating in the same spectrum. Again, this result is expected considering the idle activity associated with the BT module 216.

In a third test case, the client device 202 was streaming audio content over its BT module from its hard disk drive (HDD) to a BT peripheral device 204 using the A2DP profile previously described herein. WLAN activity for this test was idle with respect to the WLAN/BT client device 202. The other devices 208, 210, 212 were able to download data at a lower data rate (as a result of BT interference), but still at a rate that is acceptable; i.e., did not significantly degrade user experience (e.g. 1.3-1.6 Mbps). Hence, stated differently, the use of the BT interface on the WLAN/BT device 202 for an A2DP profile reduced the peak data rate by about 0.4-0.7 Mbps (2.0-1.6=0.4; 2.0−1.3<0.7, respectively).

In a fourth test case, the client device 202 streamed online audio received via its WLAN module over an A2DP audio profile to a BT peripheral device (e.g., headset). The other network client devices 208, 210, 212 were able to download data at a constant and acceptable rate (e.g. 0.6-0.9 Mbps). However, the A2DP did experience frequently "dropouts" in this usage scenario.

In a fifth test case, the client device 202 was attempting to stream A2DP over its BT module from its HDD, while at the same time downloading data over its WLAN module. The other devices 208, 210, 212 were also attempting to download data (such as an audio MP3 file, etc.). In this usage case, the WLAN data rate was unacceptably low (e.g. 0-0.3 Mbps) for both the client device 202 as well as the other devices 208, 210, 212 in the network 200. This clearly illustrates a typical "bad neighbor" behavior, i.e., one device 202 largely monopolizing spectrum or its own BT-related uses to the detriment of its own WLAN interface, and those of other neighboring client devices 208, 210, 212. In addition, the A2DP audio stream of this fifth test case was essentially broken. In essence, the fifth usage case has overloaded the network 200.

Accordingly, the previous test cases illustrate that while operation of the WLAN interface so that it always defaults to a power-saving mode (e.g., PM=2) can provide acceptable operating flexibility without significant degradation of user experience or data rate for many WLAN/BT operating combinations, some salient operating combinations do exist where such power-saving default mode operation does not provide acceptable results. Accordingly, for such cases, further methodologies of the present invention are employed (in addition to maintaining WLAN in a default power-saving (PM=2) mode) to enhance the network capacity, so as to provide an acceptable data rate and user experience. It will be appreciated that these additional methodologies may be employed in the cases (e.g., test cases 1-4 described above) where not really needed as well, so as to further enhance data rate and/or user experience on BT devices above that achievable with the power-saving default methodology described above alone.

Second Variant (Power-Saving Default Mode Plus Enhanced Management Functions)

Figure 3:
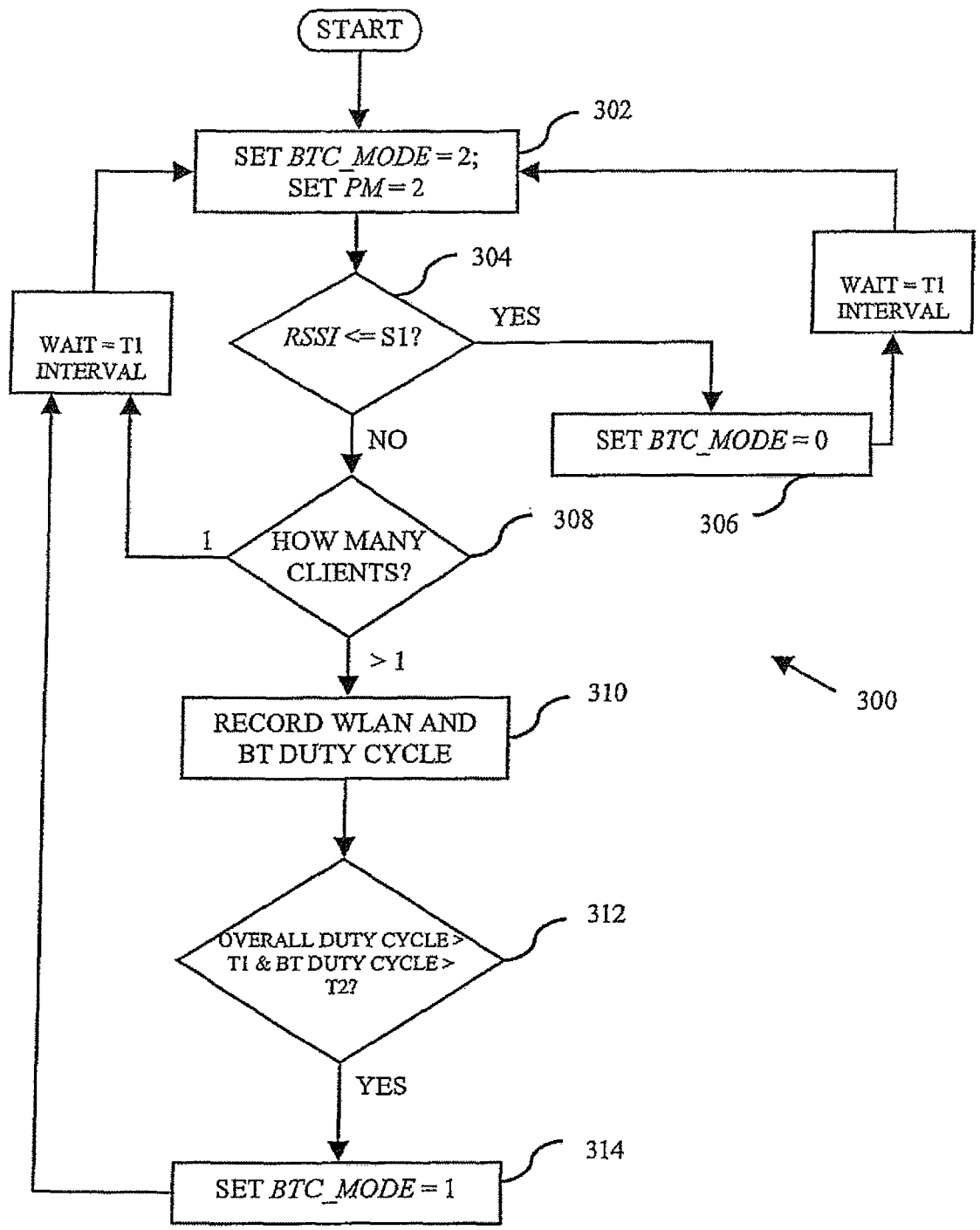
FIG. 3 is a logical flow diagram illustrating a first exemplary method for implementing network capacity enhancement in a network comprising multiple overlapping wireless protocols.

Referring now to FIG. 3, a first exemplar methodology 300 for enhancing network capacity in a co-existence environment is shown and described in detail.

At step 302 of the method 300, the management module/software previously described with respect to the apparatus of FIGS. 2A-2D implements its network capacity enhancement algorithm, and sets the WLAN driver to implement a power saving mode (e.g., PM=2) as the default setting for the WLAN driver, as previously discussed. This power-saving mode is utilized even if the network capacity enhancement apparatus is connected to a power supply, and essentially keeps the WLAN interface in a "sleep" or reduced power consumption mode whenever possible (i.e., when the device is not transmitting data over the WLAN module). Such power-saving or sleep modes may be accomplished using any number of different well-known approaches such as e.g., shutting down all or parts of the WLAN interface processor pipeline, shutting down functional modules such as memory or transceivers, etc.; accordingly, these techniques are not described further herein.

As part of step 302, the BT interface is set to btc_mode=2, which in this embodiment essentially protects BT transmissions as much as possible. This heightened protection node: (i) turns on the BT Adaptive Frequency Hopping (AFH) feature, (ii) Hunan Interface Devices (HID) and SCO) links are given a high priority, and (iii) A2DP priority inversion is higher than any other btc_mode. It is desirable to maintain btc_mode=2 when the WLAN is in the power-saving mode, as the BT data traffic will not impact the WLAN network capacity. Under btc_mode=2, the A2DP priority will increase after a certain number of retries (e.g. P_N=5), and the BT ACL link will also increase priority after a certain number of retires (e.g. P_N=10).

At step 304, the received signal strength indication (RSSI) is evaluated against a threshold value S1. One purpose of this evaluation is to determine the extant power being radiated into the frequency spectrum of interest, thereby providing an idea of whether other devices 208, 210, 212 are operating in the area. This threshold value can be determined based on any one or more applicable networking parameters, and might for instance comprise a value of −70 dBm. If the measured RSSI is less than or equal to this threshold value, then BT is set to btc_mode=0 at step 306. The mode btc_mode=0 is an operating level that implements a minimum coexistence scheme. Specifically, in this embodiment: (i) AFH is turned on, (ii) HID has a high priority, but (iii) the SCO link, A2DP and asynchronous connection-less (ACL) link are given a lower priority than the WLAN normal traffic. For instance, if both WLAN and BT A2DP are active, the client device 202 will turn off coexistence for BT A2DP and ACL (however, BT mouse and keyboard may remain protected, so as to avoid significant degradation of essential user experience elements such as control of their computer). By turning off coexistence, the network capacity is advantageously protected, and the WLAN can maintain its minimum level of acceptable network traffic capacity. The system then waits a predetermined amount of time before returning to step 302.

If the RSSI is not less than a predetermined threshold value, then the number of clients connected to the AP is determined at step 308. In one variant, the client management system will periodically monitor the network status by pinging (messaging or signaling) the AP (IP:XX.XX.XX.FF); e.g., by issuing a PING XX.XX.XX.FF command. In response, the AP informs the client device apparatus how many other clients are also connected to the AP. If the WLAN/BT client 202 is the only device connected to the AP, or the number of other clients is below a predetermined threshold (N), then the algorithm waits a predetermined time before restarting the process at step 302. If the number of other clients connected to the AP exceed the threshold (e.g. one or more other clients, or N greater than or equal to 1), then the client management software will implement measures to enhance network capacity, and act as a "good neighbor" to the other client devices at step 310.

At step 310, the management software determines the total duty cycle of the client device 202 implementing the co-located wireless protocols. One exemplary approach is in the case where the client has the software to manage the AP (such as "Airport Utility AU" for example), then the AU will report how many clients are connected, and the duty cycle of each client. The well known SNMP (simple network management protocol) or another similar protocol may be used for this purpose. Other approaches may be used as well, as will be recognized by those of ordinary skill.

In addition, the total duty cycle may be analyzed to determine the relative percentages of the duty cycle used for WLAN and for BT. The percentage reserved for BT uses is determined using in one variant a request-to-send/clear-to-send (RTS)/CTS2SELF scheme, although other approaches may be used as well. In effect the BT interface is asking permission of the management module on how much of the duty cycle it can utilize (and when). In one scenario, the BT interface sends a request to the WLAN interface, if the WLAN has the permission to own the network (i.e., if it has received packet from AP for Request to Send), and then the WLAN interface will send "CTS2SELF" packet to the AP to inform the AP when and how long it wants to "hold the air time". Then WLAN interface then further informs the BT interface to use that air time.

The WLAN/BT percentage values are stored in memory where they may be logged, or overwritten following the next duty cycle analysis iteration.

At step 312, the overall duty cycle is evaluated against a threshold value T1. The BT duty cycle is then evaluated against a threshold value T2. In some embodiments, the latter determination may be contingent on the overall duty cycle exceeding the threshold value T1. If both the overall duty cycle and BT duty cycle exceed their respective threshold values, then corrective action is taken, and the btc_mode parameter is set to a prescribed value (e.g., 1) at step 314.

Under this second coexistence scheme (i.e., btc_mode=1): (i) the BT AFH is turned on, (ii) HID and SCO are given a high priority, however (iii) A2DP is given a reduced priority, and (iv) the ACL link is further reduced. In one exemplary embodiment, the A2DP priority is reduced (as compared to btc_mode=2), and will only increase in priority after a higher number of retries (e.g. P_N=10). Similarly, the ACL priority is reduced (as compared to btc_mode=2), and will only increase in priority after a higher number of retries (e.g. P_N=15).

Alternatively, or in addition to the aforementioned measures, the A2DP audio quality may be reduced by e.g., reducing the audio bitpool, or other measures which can reduce the bandwidth necessary to carry the audio data (e.g., lower bitrate or more lossy codec).

Periodically, the foregoing process will be repeated so as to keep the management process/algorithm apprised of current network conditions, and respond appropriately by dynamically adjusting the duty cycle of the client device 202. The aforementioned management algorithm monitors the BT duty cycle closely, and if the BT module requests an amount of bandwidth that will reduce WLAN network capacity beyond an acceptable level, the coexistence scheme discussed above will reject the request (or provide as much bandwidth as then available consistent with not detracting from WLAN network capacity).

It will also be appreciated that while the methodology of FIG. 3 utilizes a threshold-based RSSI evaluation to implement its BT module control logic, other parameters and approaches may be used with equal success.

Figure 4:
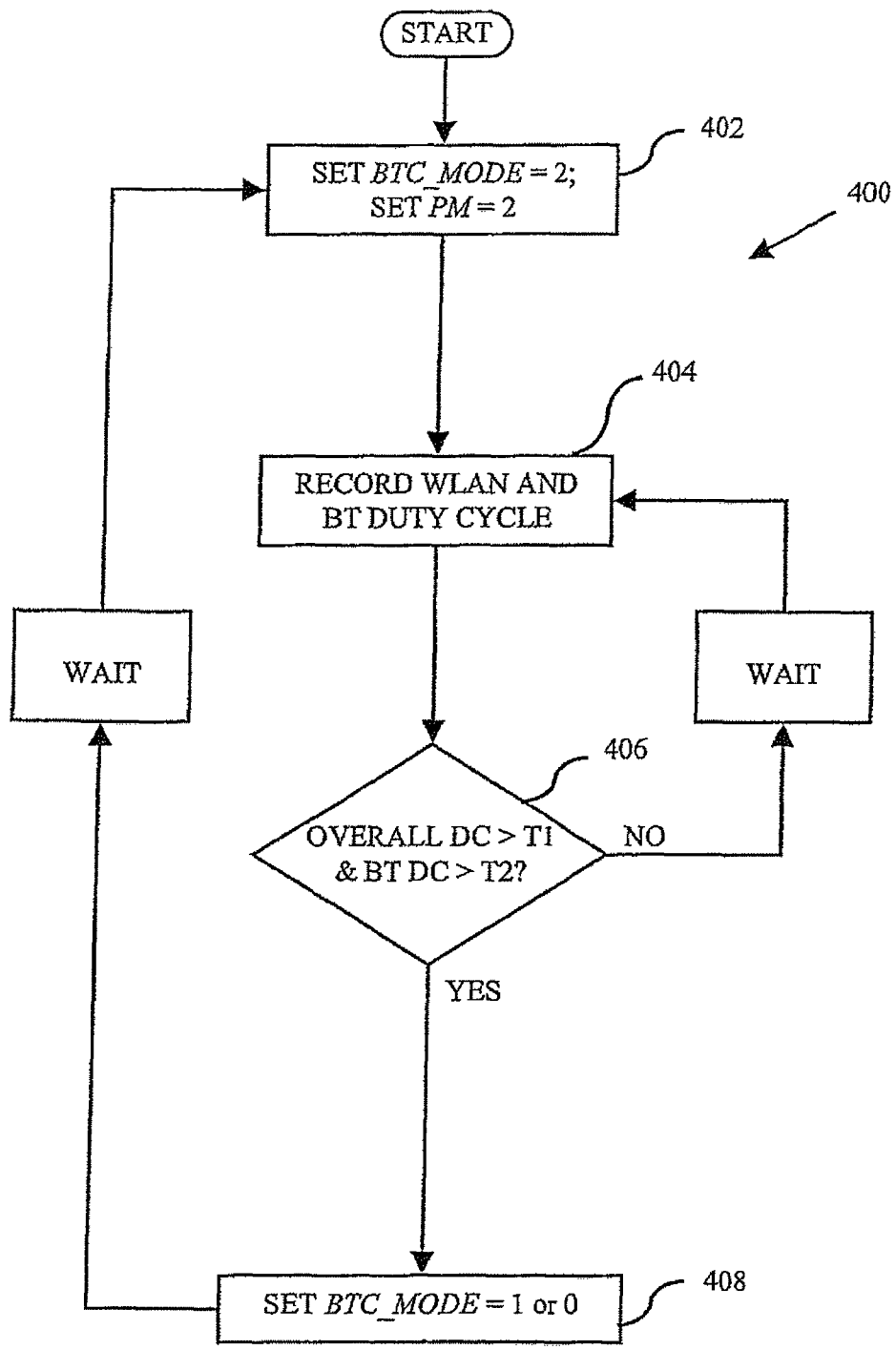
FIG. 4 is a logical flow diagram illustrating a second exemplary method for implementing network capacity enhancement in a network comprising multiple overlapping wireless protocols.

Referring now to FIG. 4, a second exemplary methodology 400 for enhancing network capacity in a co-existence environment is shown and described in detail. Notably, the methodology of FIG. 4 relies exclusively on enhancing network capacity via information known within the client device itself.

At step 402, the management software implements the network capacity enhancement algorithm and sets the WLAN driver to implement a power-saving mode (PM=2) as the default setting for the WLAN driver, as previously discussed. Alternatively, the power-saving mode default mode setting may be preset by the WLAN driver chipset manufacturer. As previously noted, this power-saving mode is utilized even if the network capacity enhancement apparatus is connected to a limitless power supply (e.g., wall converter), and essentially keeps the WLAN in a sleep mode whenever it is possible (i.e. when the device is not transmitting data over the WLAN module). The BT module is set to btc_mode=2, which protects BT transmissions to a maximal degree. As discussed with respect to FIG. 3, this heightened protection mode: (i) turns Adaptive Frequency Hopping (AFH) on, (ii) Human Interface Devices (HID) and SCO link are given a high priority, and (iii) and A2DP priority inversion is higher than any other btc_mode scheme. As before, it is desirable to maintain btc_mode=2 when the WLAN is in the power-save mode, and under btc_mode=2, A2DP and BT ACL link priorities will increase after a respective certain number of retries.

Optionally, the received signal strength indication (RSSI) is evaluated against a threshold value S1 as part of the method 400, as was discussed with respect to FIG. 3. If the RSS is less than or equal to this threshold value, then the BT interface is set to btc_mode=0, wherein: (i) AFH is turned on, (ii) HID has a high priority, but (iii) the SCO link, A2DP and asynchronous connection-less (ACL) link are given a lower priority than the WLAN normal traffic. For instance, if both WLAN and BT A2DP are active, the client device 202 will turn off coexistence for BT A2DP and ACL (the BT mouse and keyboard functions will remain protected). The system would then wait a predetermined amount of time before returning to step 402.

At step 404, the management software determines the total duty cycle of the client device 202 as discussed above. In addition, the total duty cycle is analyzed to determine the relative percentages of the duty cycle used for WLAN and for BT. The percentage utilized to reserve for its BT is determined using an RTS/CTS2SELF or other such scheme. As with the method 300 of FIG. 3, these values are stored in memory in the client device where they may be logged, or overwritten following the next duty cycle analysis iteration.

At step 406, the overall duty cycle is evaluated against a threshold value T1. The BT duty cycle is then evaluated against a threshold value T2. In some embodiments, the latter determination may be made contingent on the overall duty cycle exceeding the threshold value T1. If both the overall duty cycle and BT duty cycle exceed there respective threshold values, then corrective action is taken, and btc_mode is set to a value of either 1 or 0 at step 408, as discussed in greater detail below. If one or more of the duty cycles are not exceeded, the system will wait before returning to step 404 where the WLAN and BT duty cycle are again recorded.

With btc_mode set to a value of 1: (i) the BT AFH is turned on, (ii) HID and SCO are given a high priority, however (iii) A2DP is given a reduced priority, and (iv) the ACL link priority is further reduced (as compared with btc_mode=2). In one exemplary embodiment, the A2DP priority is increased after a certain number of retries (e.g. P_N=10) while the ACL priority is also increased after a higher number of retries (e.g. P_N=15). Alternatively, or in addition to the aforementioned measures, the A2DP audio quality may be reduced by reducing the audio bitpool, bitrate, etc. as previously described. This process will be periodically repeated so as to keep the management algorithm apprised of current network conditions, and respond appropriately by dynamically adjusting the duty cycle. The aforementioned algorithm again monitors the BT duty cycle and arbitrates BT requests for bandwidth as previously discussed with respect to the method 300 of FIG. 3.

Figure 5:
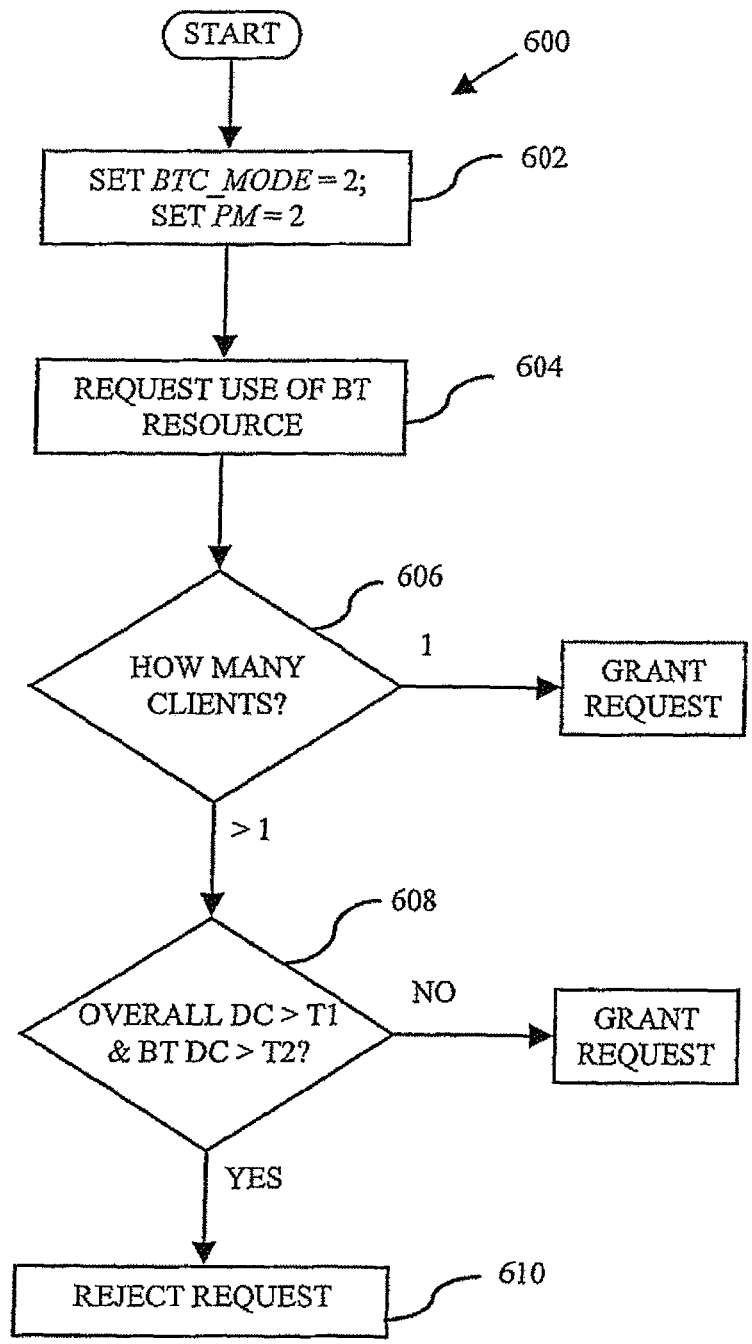
FIG. 5 is a logical, flow diagram illustrating a third exemplary method for implementing network capacity enhancement in a network comprising multiple overlapping wireless protocols.

Referring now to FIG. 5, a third exemplary methodology 500 for enhancing network capacity in a co-existence environment is shown and described in detail. At step 502, the management software implements the network capacity enhancement algorithm and sets the WLAN driver to implement a power saving mode (PM=2) as the default setting for the WLAN driver, or the power saving mode default mode setting could be preset by the WLAN driver chipset manufacturer as noted above. Again, this power saving mode is utilized even if the network capacity enhancement apparatus is connected to a limitless power supply and essentially keeps the WLAN in a sleep mode whenever it is possible. The BT module is set to btc_mode=2, which essentially protects BT transmissions to the maximal degree as discussed previously.

At step 504, the client device 202 desires to utilize a BT resource, and issues a request through the WLAN module/PHY to an AP 206 (see FIG. 2) in communication with the client device 202. In one instance, the request might comprise a request to utilize the A2DP audio profile to stream content from the Internet to a BT peripheral such a headset. Alternatively, the request might be to utilize a BT-enabled mouse and/or keyboard. Myriad other requests will be appreciated by those of ordinary skill given the present disclosure as well.

At step 506, the WLAN AP receives the request from the client device 202 asking for permission to utilize a BT resource on that client device. The AP performs its relevant analysis; e.g., in one embodiment, determining the number of clients presently connected to that AP 206. If the requesting client device 202 is the only device connected to the AP, the AP may issue a response to the requesting client device which grants permission to utilize the BT resources available on the client device. If the client device is not the only device connected to the AP, the AP will next determine one or more network operating parameters at step 508.

At step 508, the AP determines whether the overall duty cycle exceeds a first threshold value T1, and if it does, the AP next determines whether the BT duty cycle will exceed a second threshold T2 if it grants the BT use request from the requesting client device 202. Alternatively, the AP may determine both the overall duty cycle, WLAN duty cycle, and/or the BT duty cycle against a given network capacity function to de ermine whether or not it should grant the request. For instance, if the requesting client device 202 was seeking permission to utilize a BT connection for a wireless mouse and/or keyboard, the AP may "feel confident" that the requested BT resource(s) would not degrade network capacity enough to affect user experience on the network. Accordingly, the AP would grant the request to the requesting client device.

On the other hand, if the requesting client device requests to utilize the A2DP audio profile to stream content from the client device HDD, the AP might determine that the requested BT resource would degrade network capacity enough to significantly affect user experience, and the AP would reject the request.

It will be appreciated that myriad other algorithms could be utilized by the AP of this embodiment (and in fact the management processes of other embodiments previously described) to determine or estimate whether the requested resource would degrade network capacity and/or user experience beyond an acceptable level, the foregoing algorithm being merely illustrative of the broader principles of the invention. For example, the aforementioned determinations of degradation of capacity and user-experience may be prestrode within the management module/algorithm, such that when a prescribed set of conditions are met, the same decision results (e.g., "go" or "no go" on granting the request). Alternatively, the determination can be structured so as to be dynamic and "living"; i.e., the management algorithm collects necessary or available data, and analyzes this data ad hoc so as to determine a result which may be unique to that particular circumstance, and without reference to a pre-stored result or logic. Moreover, the decisions made by the management algorithm may be structured according to any number of different logic paradigms or constructs; e.g., discrete logic ("yes/no" or "grant/no grant"), fuzzy logic (e.g., "grant none/grant some/grant all"), Dempster-Shaefer, etc. Hence, the management logic can be literally as sophisticated or simplistic as desired, and in fact may dynamically switch back and forth between alternative logical routines when one is better adapted to a particular data set obtained for a given circumstance (i.e., some decision processes may be better suited to different types of available information).

In an alternative embodiment, the AP 206 could comprise a user-selectable group of parameters. These parameters could be selected by a user of the AP (or the network administrator for the AP) to determine what levels of service need to be provided by the network carried by the AP. For instance, in QoS-intensive applications, the network administrator might request a high level of service for the network, and hence would implement a stricter policy when considering whether or not to grant a request to utilize a BT resource on a client device. Similarly, where WLAN data traffic speed or continuity is preeminent, the BT-related requests might be limited to only "essential" BT applications such as e.g., keyboard or mouse functions (the network administrator can decide or populate the AP listing with the profiles he/she believes are "essential", for example.

Conversely, in applications where data throughput is not of a high concern, and user flexibility/experience in terms of being able to use multiple PAN/BT devices simultaneously is paramount, the grant policy may be more permissive allowing a wider range of requests for a BT resource.

Moreover, the AP policies may be enforced on a sliding scale of sorts; e.g., variable levels of allocation as a function of network conditions, such as where a minimum level of BT bandwidth is allocated to a client device 202 under a first network condition, but that allocation is increased as more bandwidth is freed up (such as by one or more WLAN devices 208, 210, 212 leaving the AP).

In yet another alternative, these user-selectable parameter may be specified by the user of the client device 202 irrespective of the AP 206. For instance, a user might decide that in their home network that they want greater latitude and flexibility to utilize BT resources on their client device. Accordingly, the client device 202 itself (along with its management software) is configured to be more permissive in allowing the client device to utilize BT resources, even where that resource may degrade network capacity in the user's home network.

A software or other switch (e.g., GUI icon or mechanism) may also be used to invoke user-based changes to rule or policy sets. For example, a toolbar or on-screen icon may be displayed on the user's PC or laptop that permits them to change between AP rule sets or profiles (e.g., a "Bluetooth priority" profile which prioritizes BT functions, versus a "WLAN priority" profile, which prioritizes WLAN data rate). Such profiles may also be user-, application-, or location-specific.

Methods of Doing Business—

In another aspect of the invention, methods of doing business relating to the aforementioned apparatus and operational methods are disclosed.

Figure 6:
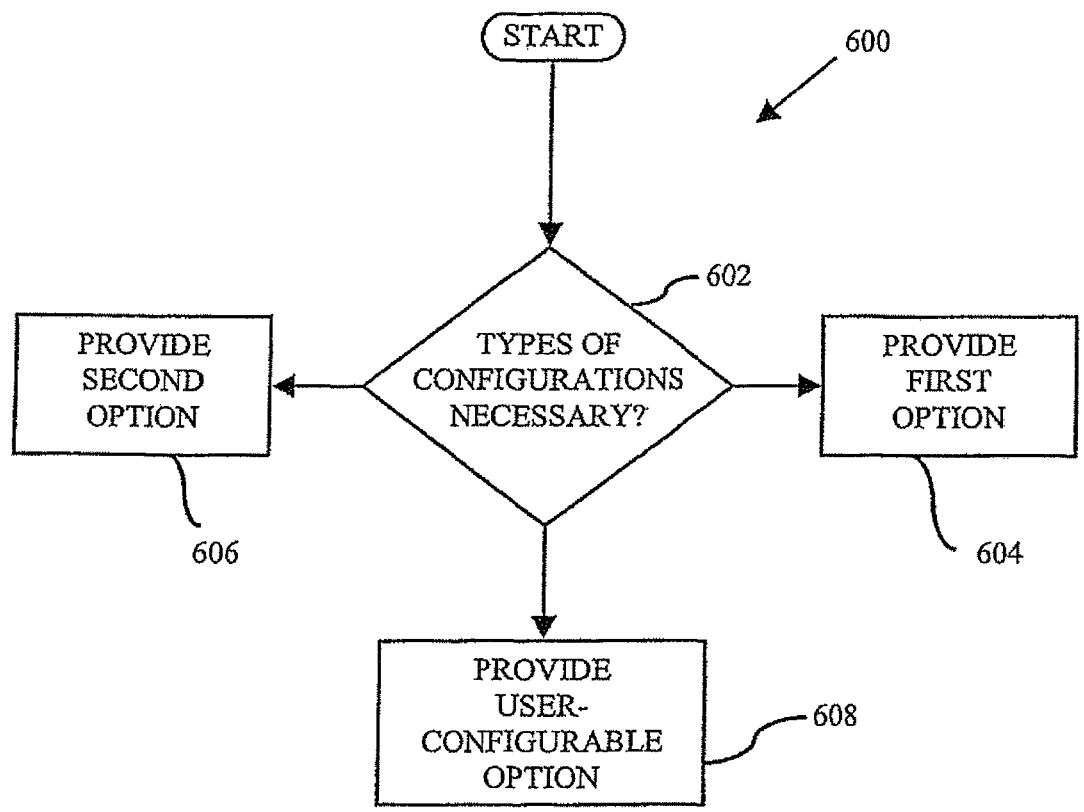
FIG. 6 is a logical flow diagram illustrating a first exemplary method of doing business in which a user is permitted to select from among a plurality of configuration options for a WLAN/BT enabled apparatus.

In one embodiment (see FIG. 6), the method 600 comprises providing (e.g., selling for valuable consideration) portable computers such as laptops, PDAs, smartphones, or other client devices or services (e.g., the Apple MacBook Air™ laptop computer, or Apple TV™ set-top box and service, provided by the Assignee hereof) that have include the network capacity enhancement features discussed previously herein. Specifically, as shown in FIG. 6, the client device configuration is first determined per step 602, including selection of various options by a consumer. This may be accomplished for example via, the Internet (e.g., using an on-line configuration interface or "wizard" or routine) which allows the customer to configure their prospective device according to any number of different options ("builds").

At step 604, a first option is presented to the user. This first option might be for instance directed to a fixed configuration for applications where the number of users attached to a given AP at any given time would be expected to be low (e.g. residential applications). Accordingly, the parameters selected for evaluation and thresholds for triggering certain configurations as discussed above (e.g. the number of A2DP and ACL retries, btc_mode thresholds, RSSI, etc.) will be set according to expectations or assumptions about the environment in which the device will be utilized. For instance, in the context of the aforementioned residential application, it may be desirable to worry less about WLAN network capacity and instead implement more permissive policies with regards to using a BT peripheral device. The selection of this option in effect inserts a profile, thereby obviating the user having to hand-select or configure one or more parameters or thresholds (as in the user-configurable option of step 608 discussed below).

Conversely, in an enterprise (e.g., corporate) environment, WLAN data capacity may be paramount. As another alternative, military or government applications may wish to frustrate or dissuade use of BT profiles that have limited security (e.g., encryption or authentication) features so as to prevent spoofing, man-in-the-middle, or other surreptitious attacks which might result in divulgence of sensitive or classified materials. Hence, at step 606, a second option is presented to the user; for instance, for a fixed configuration for applications where the number of users attached to a given AP at any given time, and/or the number of APs expected to exist in a limited space, would be expected to be high (e.g. commercial applications). Accordingly, the parameters and/or thresholds for triggering certain configurations as discussed above may be different than those for the first option of step 604. Again, substantially automatic configuration is provided with this option, as with the first option of step 604.

At step 608, a user may select a user-configurable option. This user-configurable option might be for a more advanced or experienced user who wishes to select various options (e.g. the number of A2DP and ACL retries, btc_mode thresholds, RSSI, etc.) according to any given operating environment. By providing a user-configurable option, the user might for instance be able to utilize more permissive or alternatively, more restrictive policies with regards to BT peripheral, device usage and change between policies whenever desired. They can also choose the parameter set-values most relevant to their particular circumstance. The present invention also envisions the use of a "management macro generator/editor" or the like which would allow the advanced user the capability to generate customized logical rules or policies to be implemented by the manage ent module of their device.

In another aspect of the invention, consumers may bring back their already purchased client devices (e.g., laptops, smartphones, PDAs, etc.) for or after reconfiguration so as to have them "re-optimized" for the new configuration. Alternatively, the user's device may be configured with its own indigenous evaluation/optimization capability as previously described above. For example, a laptop user might install a Wi-Fi card themselves if their production device was not so equipped. With the new card, there may be significant interference with another existing or co-installed air interface, or between an extant BT interface and other WLAN devices, hence requiring network capacity enhancement optimization according to the methods described herein.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. Network apparatus, comprising:
    a first wireless module in communication with a first network configured to operate according to a first wireless protocol;
    a second wireless module in communication with a second network configured to operate according to a second wireless protocol, the second wireless protocol being different than the first wireless protocol; and
    a management module configured to receive first data relating to a duty cycle of at least one of the first wireless protocol module and the second wireless protocol module, the management module configured to dynamically adjust an operating parameter of at least one of the first wireless protocol module and the second wireless protocol module in response to the received first data;

wherein the second wireless module comprises a plurality of operating modes, and the dynamic adjustment of the operating parameter comprises dynamic selection of individual ones of the plurality of operating modes of the second module; and wherein each of the plurality of operating modes of the second wireless module comprise a priority level for a given operating profile, the priority level configured to vary between the plurality of operating modes.

2. The network apparatus of claim 1, wherein the first wireless protocol comprises an Institute of Electrical and Electronics Engineers (IEEE)-Std. 802.11 wireless protocol.

3. The network apparatus of claim 2, wherein the second wireless protocol comprises a Bluetooth protocol, and the given operating profile comprises an Advanced Audio Distribution Profile (A2DP).

4. The network apparatus of claim 1, wherein:
the first wireless module and the second wireless module are in data communication; and
the first wireless module and the second wireless module are configured to coordinate operation via the data communication.

5. A method of operating a portable wireless device comprising a plurality of differing wireless modules each operating at least partly within a same frequency spectrum, the method comprising:
receiving a request comprising at least first data relating to a duty cycle of at least one of a first wireless protocol module and a second wireless protocol module;
evaluating at least one of a first duty cycle parameter associated with the first wireless module and a second duty cycle parameter associated with the second wireless module; and
dynamically adjusting a first operating parameter of at least one of the first wireless module and the second wireless module based at least in part on the act of evaluating;
wherein the second wireless module comprises a plurality of operating modes, and the dynamic adjustment of the operating parameter comprises dynamic selection of individual ones of the plurality of operating modes of the second module; and
wherein each of the plurality of operating modes of the second wireless module comprise a priority level for a given operating profile, the priority level varying between the plurality of operating modes.

6. The method of claim 5, further comprising:
implementing a default power save mode for the first of the plurality of wireless modules of the device; and
evaluating a receiver signal strength associated with the first wireless module against a predetermined threshold;
wherein the act of adjusting the first operating parameter is further based at least in part on the act of evaluating the receiver signal strength.

7. The method of claim 6, wherein the act of evaluating the receiver signal strength comprises determining a receive signal strength indicator (RSSI).

8. The method of claim 5, wherein the act of adjusting the first operating parameter comprises at least adjusting a duty cycle of at least one of the wireless modules.

9. The method of claim 5, further comprising:
determining a total duty cycle parameter of the first and the second wireless modules; and
evaluating the total duty cycle parameter against at least one duty cycle parameter of the first and the second cycle parameters.

10. The method of claim 5, wherein the act of adjusting of the first operational parameter comprises at least adjusting a data rate transmission speed of the second wireless module.

11. The method of claim 5, wherein the act of adjusting of the first operational parameter comprises at least adjusting a prioritization of data transfer over the second wireless module.

12. The method of claim 5, wherein the act of adjusting of the first operational parameter comprises at least disabling an operational profile or mode of the second wireless module.

13. A computer readable apparatus having a storage medium comprising a plurality of instructions which are configured to, when executed:
receive a request comprising at least data relating to a duty cycle of at least one of a first wireless protocol and a second wireless protocol module of a client device;
determine the duty cycle parameter associated with the first wireless module and the second wireless module;
evaluate the duty cycle parameter against at least one duty cycle parameter of a first cycle parameter and a second cycle parameter; and
transmit a response to the client device, the response configured to adjust an operating parameter of at least one of the first wireless protocol module and the second wireless protocol module based at least in part on the evaluation;
wherein the second wireless module comprises a plurality of operating modes, and the dynamic adjustment of the operating parameter comprises dynamic selection of individual ones of the plurality of operating modes of the second module; and
wherein each of the plurality of operating modes of the second wireless module comprise a priority level for a given operating profile, the priority level varying between the plurality of operating modes.

14. The apparatus of claim 13, wherein:
the first wireless protocol module comprises a Wi-Fi compliant interface and the second wireless protocol module comprises a Bluetooth-compliant interface; and
the adjustment of the operating parameter comprises selection of one of a plurality of operating modes associated with the Bluetooth-compliant interface.

15. The apparatus of claim 13, wherein the plurality of instructions are further configured to, when executed:
evaluate usage of the at least one wireless interface with a number of client devices in current data communication with the access point;
wherein the adjustment of the operating parameter further based at least in part on the evaluation.

16. The apparatus of claim 15, wherein the evaluated usage comprises at least a determination of a bandwidth usage of the access point.

17. The apparatus of claim 13, wherein the adjustment of the operating parameter is further based on a comparison the duty cycle of at least one of the first and second wireless protocol modules of the client device which sent the request against at least one threshold parameter.

18. The apparatus of claim 13, wherein the plurality of instructions are further configured to, when executed, adjust the first cycle parameter comprises at least adjust a duty cycle of at least one of the wireless modules.

19. The apparatus of claim 13, wherein the plurality of instructions are further configured to, when executed:
determine a total duty cycle parameter of the first wireless module and the second wireless module; and evaluate the total duty cycle parameter against at least one duty cycle parameter of the first and the second cycle parameters.

20. The apparatus of claim 13, wherein the plurality of instructions are further configured to, when executed:
  implement a default power save mode for the first of the plurality of wireless modules of the device; and
  evaluate a receiver signal strength associated with the first wireless module against a predetermined threshold.

* * * * *